US009569770B1

(12) United States Patent
Jesensky et al.

(10) Patent No.: US 9,569,770 B1
(45) Date of Patent: Feb. 14, 2017

(54) GENERATING CONSTRUCTED PHRASES

(75) Inventors: James Jesensky, Bellevue, WA (US); Isaac Oates, Seattle, WA (US); Steve Huynh, Seattle, WA (US); Vinay Vaidya, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 953 days.

(21) Appl. No.: 12/353,091

(22) Filed: Jan. 13, 2009

(51) Int. Cl.
G06Q 20/00 (2012.01)
G06Q 20/38 (2012.01)

(52) U.S. Cl.
CPC .................................. G06Q 20/382 (2013.01)

(58) Field of Classification Search
USPC .................................... 704/1, 9–10; 705/64
See application file for complete search history.

(56) References Cited

U.S. PATENT DOCUMENTS

| 4,674,065 | A | 6/1987 | Lange et al. |
| 4,773,039 | A | 9/1988 | Zamora |
| 5,255,386 | A | 10/1993 | Prager |
| 5,696,962 | A | 12/1997 | Kupiec |
| 5,710,887 | A | 1/1998 | Chelliah et al. |
| 5,721,902 | A | 2/1998 | Schultz |
| 5,771,378 | A | 6/1998 | Holt et al. |
| 5,828,991 | A | 10/1998 | Skiena et al. |
| 5,862,321 | A | 1/1999 | Lamming et al. |
| 5,870,473 | A | 2/1999 | Boesch et al. |
| 5,898,825 | A | 4/1999 | Eberhard |
| 5,907,824 | A | 5/1999 | Tzirkel-Hancock |
| 5,953,710 | A | 9/1999 | Fleming |
| 5,963,965 | A | 10/1999 | Vogel |
| 6,047,268 | A | 4/2000 | Bartoli et al. |
| 6,141,760 | A | 10/2000 | Abadi et al. |
| 6,178,396 | B1 * | 1/2001 | Ushioda ......................... 704/1 |
| 6,202,064 | B1 | 3/2001 | Julliard |
| 6,314,419 | B1 | 11/2001 | Faisal |
| 6,332,131 | B1 | 12/2001 | Grandcolas et al. |
| 6,377,965 | B1 | 4/2002 | Hachamovitch et al. |
| 6,411,950 | B1 | 6/2002 | Moricz et al. |

(Continued)

FOREIGN PATENT DOCUMENTS

| EP | 1077436 | 2/2001 |
| JP | H11265413 A | 9/1999 |

(Continued)

OTHER PUBLICATIONS

Utility U.S. Appl. No. 11/548,111, filed Oct. 10, 2006, entitled "Utilizing Phrase Tokens in Transactions" Agarwal, et al.

(Continued)

Primary Examiner — Tsan-Yu J Huang
(74) Attorney, Agent, or Firm — Lee & Hayes, PLLC

(57) ABSTRACT

Techniques for generating and providing phrases are described herein. These techniques may include analyzing one or more sources to generate a first corpus of phrases, each of the phrases for use as an identifier and/or for association with a user. Once a first corpus of phrases has been generated, these phrases may be filtered to define a second corpus of phrases. Phrases of this second corpus may then be suggested to one or more users. In some instances, the phrases suggested to a particular user are personalized to the user based on information previously known about the user or based on information provided by the user.

20 Claims, 18 Drawing Sheets

(56) References Cited

U.S. PATENT DOCUMENTS

| | | |
|---|---|---|
| 6,496,931 B1 | 12/2002 | Rajchel et al. |
| 6,539,481 B1 | 3/2003 | Takahashi et al. |
| 6,564,213 B1 | 5/2003 | Ortega et al. |
| 6,640,304 B2 | 10/2003 | Ginter et al. |
| 6,658,568 B1 | 12/2003 | Ginter et al. |
| 6,665,659 B1 | 12/2003 | Logan |
| 6,697,793 B2 | 2/2004 | McGreevy |
| 6,853,987 B1 | 2/2005 | Cook |
| 6,856,963 B1 | 2/2005 | Hurwitz |
| 6,892,198 B2 | 5/2005 | Perisic et al. |
| 6,988,657 B1 | 1/2006 | Singer et al. |
| 7,035,789 B2 * | 4/2006 | Abrego et al. ............... 704/9 |
| 7,076,652 B2 | 7/2006 | Ginter et al. |
| 7,136,841 B2 | 11/2006 | Cook |
| 7,184,950 B2 | 2/2007 | Weise |
| 7,191,115 B2 | 3/2007 | Moore |
| 7,197,455 B2 | 3/2007 | Sudo et al. |
| 7,213,748 B2 | 5/2007 | Tsuei et al. |
| 7,264,152 B2 | 9/2007 | Tsuei et al. |
| 7,383,224 B2 | 6/2008 | Huennekens et al. |
| 7,395,241 B1 | 7/2008 | Cook et al. |
| 7,418,444 B2 | 8/2008 | Flank et al. |
| 7,426,507 B1 | 9/2008 | Patterson |
| 7,519,590 B2 | 4/2009 | Chandrasekar et al. |
| 7,548,899 B1 | 6/2009 | Del Favero, Jr. et al. |
| 7,565,345 B2 | 7/2009 | Bailey et al. |
| 7,664,831 B2 | 2/2010 | Cartmell et al. |
| 7,676,507 B2 | 3/2010 | Maim |
| 7,865,567 B1 | 1/2011 | Hendricks et al. |
| 7,912,702 B2 | 3/2011 | Bennett |
| 7,925,498 B1 | 4/2011 | Baker et al. |
| 7,991,608 B2 | 8/2011 | Johnson et al. |
| 8,037,086 B1 | 10/2011 | Upstill et al. |
| 8,065,328 B2 | 11/2011 | Strandel et al. |
| 8,131,540 B2 | 3/2012 | Marchisio et al. |
| 8,136,034 B2 | 3/2012 | Stanton et al. |
| 8,150,769 B2 | 4/2012 | Gupta et al. |
| 8,161,534 B2 | 4/2012 | Golle et al. |
| 8,166,045 B1 | 4/2012 | Mazumdar et al. |
| 8,170,954 B2 | 5/2012 | Keresman, III et al. |
| 8,190,628 B1 | 5/2012 | Yang et al. |
| 8,266,169 B2 | 9/2012 | Bobrow et al. |
| 8,316,041 B1 | 11/2012 | Chang et al. |
| 8,316,296 B2 | 11/2012 | Paek et al. |
| 8,346,792 B1 | 1/2013 | Baker et al. |
| 8,359,190 B2 | 1/2013 | Kirshenbaum |
| 8,359,191 B2 | 1/2013 | Chen et al. |
| 8,374,871 B2 | 2/2013 | Ehsani et al. |
| 8,380,491 B2 | 2/2013 | Leacock et al. |
| 8,423,349 B1 | 4/2013 | Huynh et al. |
| 8,484,016 B2 | 7/2013 | Brockett et al. |
| 8,484,089 B1 | 7/2013 | Lin et al. |
| 8,516,013 B2 | 8/2013 | Geller |
| 8,661,012 B1 | 2/2014 | Baker et al. |
| 8,799,658 B1 | 8/2014 | Sellier et al. |
| 2001/0032192 A1 | 10/2001 | Putta et al. |
| 2001/0041977 A1 * | 11/2001 | Aoyagi et al. ............ 704/246 |
| 2002/0032564 A1 | 3/2002 | Ehsani et al. |
| 2002/0046169 A1 | 4/2002 | Keresman, III et al. |
| 2002/0112171 A1 * | 8/2002 | Ginter et al. ............ 713/185 |
| 2002/0123973 A1 | 9/2002 | Eccles et al. |
| 2002/0188587 A1 | 12/2002 | McGreevy |
| 2002/0188621 A1 | 12/2002 | Flank et al. |
| 2003/0004716 A1 | 1/2003 | Haigh et al. |
| 2003/0061170 A1 | 3/2003 | Uzo |
| 2003/0065919 A1 | 4/2003 | Albert et al. |
| 2003/0088784 A1 | 5/2003 | Ginter et al. |
| 2003/0120108 A1 | 6/2003 | Clapper |
| 2003/0187789 A1 * | 10/2003 | Karas et al. ............... 705/40 |
| 2003/0208439 A1 | 11/2003 | Rast |
| 2003/0233318 A1 | 12/2003 | King et al. |
| 2004/0030551 A1 | 2/2004 | Marcu et al. |
| 2004/0064447 A1 | 4/2004 | Simske et al. |
| 2004/0078273 A1 | 4/2004 | Loeb et al. |
| 2004/0083184 A1 | 4/2004 | Tsuei et al. |
| 2004/0098375 A1 | 5/2004 | DeCarlo, III |
| 2004/0153451 A1 | 8/2004 | Phillips et al. |
| 2004/0177120 A1 * | 9/2004 | Kirsch ..................... 709/206 |
| 2004/0199375 A1 | 10/2004 | Ehsani et al. |
| 2004/0254893 A1 | 12/2004 | Tsuei et al. |
| 2004/0254894 A1 | 12/2004 | Tsuei et al. |
| 2004/0260653 A1 | 12/2004 | Tsuei et al. |
| 2005/0027691 A1 | 2/2005 | Brin et al. |
| 2005/0044160 A1 * | 2/2005 | McElligott ............... 709/207 |
| 2005/0050469 A1 | 3/2005 | Uchimoto et al. |
| 2005/0120108 A1 | 6/2005 | Wisniewski et al. |
| 2005/0131826 A1 * | 6/2005 | Cook .......................... 705/44 |
| 2005/0171851 A1 * | 8/2005 | Applebaum et al. .......... 705/18 |
| 2005/0240536 A1 | 10/2005 | Davis et al. |
| 2006/0015484 A1 | 1/2006 | Weng et al. |
| 2006/0087941 A1 | 4/2006 | Obradovich |
| 2006/0173772 A1 | 8/2006 | Hayes et al. |
| 2006/0230022 A1 | 10/2006 | Bailey et al. |
| 2006/0253399 A1 | 11/2006 | Chatani |
| 2007/0011154 A1 | 1/2007 | Musgrove et al. |
| 2007/0022058 A1 | 1/2007 | Labrou et al. |
| 2007/0088952 A1 | 4/2007 | Hewitt et al. |
| 2007/0168469 A1 | 7/2007 | Church et al. |
| 2007/0226169 A1 | 9/2007 | Solyanik et al. |
| 2008/0019530 A1 | 1/2008 | Eldridge et al. |
| 2008/0040233 A1 | 2/2008 | Wildman et al. |
| 2008/0040274 A1 * | 2/2008 | Uzo ............................ 705/44 |
| 2008/0046366 A1 | 2/2008 | Bemmel et al. |
| 2008/0046980 A1 | 2/2008 | Peng |
| 2008/0052226 A1 | 2/2008 | Agarwal et al. |
| 2008/0082903 A1 | 4/2008 | McCurdy et al. |
| 2008/0114721 A1 | 5/2008 | Jones et al. |
| 2008/0154772 A1 | 6/2008 | Carlson |
| 2008/0162455 A1 | 7/2008 | Daga et al. |
| 2008/0168073 A1 | 7/2008 | Siegel et al. |
| 2008/0189188 A1 | 8/2008 | Morgenstern |
| 2008/0189293 A1 | 8/2008 | Strandel et al. |
| 2008/0209534 A1 | 8/2008 | Keronen et al. |
| 2008/0222711 A1 | 9/2008 | Michaelis |
| 2009/0030989 A1 | 1/2009 | Maresh et al. |
| 2009/0064294 A1 | 3/2009 | Cook et al. |
| 2009/0070103 A1 | 3/2009 | Beggelman et al. |
| 2009/0113543 A1 | 4/2009 | Adams et al. |
| 2009/0192928 A1 | 7/2009 | Abifaker |
| 2009/0234876 A1 | 9/2009 | Schigel et al. |
| 2009/0271283 A1 | 10/2009 | Fosnacht et al. |
| 2009/0282035 A1 | 11/2009 | Ferreira et al. |
| 2009/0293110 A1 | 11/2009 | Koga |
| 2009/0326953 A1 | 12/2009 | Peralta Gimenez et al. |
| 2009/0327244 A1 | 12/2009 | Rizal |
| 2010/0031043 A1 | 2/2010 | Burger et al. |
| 2010/0032192 A1 | 2/2010 | Kishi |
| 2010/0042628 A1 | 2/2010 | Crowley et al. |
| 2010/0042717 A1 | 2/2010 | Strandell et al. |
| 2010/0083103 A1 | 4/2010 | Paek et al. |
| 2010/0138397 A1 | 6/2010 | Li et al. |
| 2010/0146115 A1 | 6/2010 | Bezos |
| 2010/0146283 A1 | 6/2010 | Poitier et al. |
| 2010/0161314 A1 | 6/2010 | Karttunen et al. |
| 2010/0179801 A1 | 7/2010 | Huynh et al. |
| 2010/0250130 A1 | 9/2010 | Wiegand et al. |
| 2010/0312778 A1 | 12/2010 | Lu et al. |
| 2010/0333131 A1 | 12/2010 | Parker et al. |
| 2011/0131157 A1 | 6/2011 | Iyer et al. |
| 2011/0153854 A1 | 6/2011 | Chickering |
| 2011/0154456 A1 | 6/2011 | Machani |
| 2011/0225417 A1 | 9/2011 | Maharajh et al. |
| 2012/0072404 A1 | 3/2012 | Murphy et al. |
| 2013/0198084 A1 | 8/2013 | Agarwal et al. |
| 2013/0204789 A1 | 8/2013 | Agarwal et al. |
| 2013/0204790 A1 | 8/2013 | Agarwal et al. |

FOREIGN PATENT DOCUMENTS

| | | |
|---|---|---|
| JP | 2001357202 A | 12/2001 |
| JP | 2002163579 A | 6/2002 |
| JP | 2002197024 A | 7/2002 |
| JP | 2003308437 A | 10/2003 |
| JP | 2004005515 A | 1/2004 |

(56) References Cited

FOREIGN PATENT DOCUMENTS

| | | | |
|---|---|---|---|
| JP | 2004240764 | A | 8/2004 |
| JP | 2005018265 | A | 1/2005 |
| JP | 2006040235 | A | 2/2006 |
| WO | WO2004006194 | A1 | 1/2004 |
| WO | WO2005109268 | A1 | 11/2005 |
| WO | WO2008025037 | A2 | 2/2008 |

OTHER PUBLICATIONS

Utility U.S. Appl. No. 12/331,894, filed Dec. 10, 2008, entitled "Content Sharing" Jeffrey P. Bezos.

Utility U.S. Appl. No. 12/544,891, filed Aug. 20, 2009, entitled "Enforcing User-Specified Rules" Williams, et al.

Evernote.com, retrieved on Jul. 21, 2009 at <<http://evernote.com/>>, 5 pgs.

U.S. Appl. No. 12/352,970, filed Jan. 13, 2009, Jesensky, et al., "Generating and Suggesting Phrases".

U.S. Appl. No. 12/353,025, filed Jan. 13, 2009, Jesensky, et al., "Generating Personalized Phrases".

U.S. Appl. No. 12/353,059, filed Jan. 13, 2009, Jesensky, et al., "Generating Mined Phrases".

U.S. Appl. No. 12/353,120, filed Jan. 13, 2009, Huynh, et al., "Filtering Phrases".

U.S. Appl. No. 12/353,155, filed Jan. 13, 2009, Huynh, et al., "Filtering Phrases".

U.S. Appl. No. 12/353,170, filed Jan. 13, 2009, Huynh, et al., "Phrase Feedback Loop".

U.S. Appl. No. 12/353,184, filed Jan. 13, 2009, Gefen, et al., "Using Phrase Tokens for Performing Transactions".

"Amazon.com: What are Statistically Improbable Phrases?", retrieved on Dec. 15, 2008 at <<http://www.amazon.com/gp/search-inside/sipshelp.html>>, Amazon.com, 1 page.

"Google Sets", retrieved on Dec. 15, 2008 at <<http://labs.google.com/sets>>, Google, 1 page.

"Statistically Improbable Phrases" retrieved on Dec. 15, 2008 at <<http://en.wikipedia.org/wiki/Statistically_Improbable_Phrases>>, Wikipedia, the free encyclopedia, 2 pages.

"What are Amazon.com Statistically Improbable Phrases?", retrieved on Dec. 15, 2008 at <<http://www.amazon.com/gp/search-inside/sipshelp-dp.html>>, Amazon.com, 1 page.

Brown, et al., "Class-Based n-gram Models of Natural Language", MIT Press, Computational Linguistics, vol. 18, Issue 4, Dec. 1992, pp. 467-479.

U.S. Appl. No. 61/021,275, filed Jan. 15, 2008, Rode, et al., "Systems and Methods of Retrieving Information".

Office action for U.S. Appl. No. 12/353,025, mailed on Oct. 24, 2011, Jesenky et al., "Generating Personalized Phrases", 25 pages.

Office action for U.S. Appl. No. 12/353,184, mailed on Nov. 28, 2011, Gefen et al., "Using Phrase Tokens for Performing Transactions", 19 pages.

U.S. Appl. No. 12/510,761, filed Jul. 28, 2009, Jesensky, et al., "Determining Similar Phrases".

U.S. Appl. No. 12/715,780, filed Mar. 2, 2010, Sellier, et al, "Sharing Media Items with Pass Phrases".

Allan, et al., "Using Part-of-speech Patterns to Reduce Query Ambiguity", Proceedings of the 25th annual international ACM SIGIR conference on Research and development in information retrieval (SIGIR'02), ACM, New York, NY, pp. 307-314.

Jones, et al., "Generating Query Substitutions", WWW 2006, Edinburgh, Scotland, ACM, 2006, pp. 387-396.

Office Action for U.S. Appl. No. 12/510,761, mailed on Nov. 19, 2013, James Jesensky, "Determining Similar Phrases", 19 pages.

Office action for U.S. Appl. No. 12/715,780, mailed on Dec. 2, 2013, Sellier, et al., "Sharing Media Items with Pass Phrases", 49 pages.

Final Office Action for U.S. Appl. No. 12/510,761, mailed on Jun. 4, 2014, James Jesensky, "Determining Similar Phrases", 25 pages.

Wang, et al., "Mining Term Association Patterns from Search Logs for Effective Query Reformulation", CIKM'08, Napa Valley, CA, USA, ACM, 2008, pp. 479-488.

Office action for U.S. Appl. No. 12/353,184, mailed on Jul. 6, 2012, Gefen et al., "Using Phrase Tokens for Performing Transactions", 20 pages.

Non-Final Office Action for U.S. Appl. No. 12/544,891, mailed on May 24, 2012, Matthew T. Williams et al., "Enforcing User-Specified Rules", 17 pages.

Non-Final Office Action for U.S. Appl. No. 12/353,170, mailed on May 25, 2012, Steve Huynh et al., "Phrase Feedback Loop", 40 pages.

Non-Final Office Action for U.S. Appl. No. 12/715,780, mailed on Jun. 19, 2012, Laurent E. Sellier et al., "Sharing Media Items with Pass Phrases", 46 pages.

Office action for U.S. Appl. No. 12/352,970, mailed on Jun. 27, 2012, Jesensky et al., "Generating and Suggesting Phrases", 34 pages.

Non-Final Office Action for U.S. Appl. No. 12/353,059, mailed on Jul. 13, 2012, James Jesensky et al, "Generating Mined Phrases", 37 pages.

Non-Final Office Action for U.S. Appl. No. 12/353,120, mailed on Jul. 19, 2012, Steve Huynh et al., "Filtering Phrases", 63 pages.

Non-Final Office Action for U.S. Appl. No. 12/353,155, mailed on Aug. 1, 2012, Steve Huynh et al., "Determining Phrases Related to Other Phrases", 29 pages.

Office action for U.S. Appl. No. 12/715,780, mailed on Jul. 10, 2013, Sellier et al., "Sharing Media Items with Pass Phrases", 46 pages.

Office action for U.S. Appl. No. 12/544,891, mailed on Nov. 5, 2012, Williams et al, "Enforcing User-Specified Rules", 21 pages.

Office action for U.S. Appl. No. 12/353,170, mailed on Sep. 14, 2012, Huynh et al., "Phrase Feedback Loop", 48 pages.

Office action for U.S. Appl. No. 12/715,780, mailed on Jan. 11, 2013, Sellier et al., "Sharing Media Items with Pass Phrases", 45 pages.

Office action for U.S. Appl. No. 12/352,970, mailed on Jan. 16, 2013, Jesensky et al., "Generating and Suggesting Phrases for a User", 26 pages.

Office action for U.S. Appl. No. 12/353,059, mailed on Jan. 24, 2013, Jesensky et al., "Mining Phrases for Association With a User", 40 pages.

Office action for U.S. Appl. No. 12/353,155, mailed on Jan. 29, 2013, Huynh et al., "Determining Phrases Related to Other Phrases", 36 pages.

Final Office Action for U.S. Appl. No. 12/414,236, mailed on Jan. 30, 2015, Rajendra Kumar Vippagunta, "Querying for User Account Information", 18 pages.

Office action for U.S. Appl. No. 12/414,236, mailed on Oct. 12, 2012, Vippagunta et al., "Querying for User Account Information", 15 pages.

Non-Final Office Action for U.S. Appl. No. 11/548,111, mailed on Oct. 20, 2014, Amit D. Agarwal, "Utilizing Phrase Tokens in Transactions", 24 pages.

Final Office Action for U.S. Appl. No. 11/548,111, mailed on Nov. 13, 2009, Amit D. Agarwal, "Utilizing Phrase Tokens in Transactions", 26 pages.

Non-Final Office Action for U.S. Appl. No. 12/414,236, mailed on Dec. 8, 2011, Rajendra Kumar Vippagunta et al., "Querying for User Account Information", 12 pages.

Non-Final Office Action for U.S. Appl. No. 11/548,111, mailed on Apr. 2, 2009, Amit D. Agarwal, "Utilizing Phrase Tokens in Transactions", 21 pages.

Office action for U.S. Appl. No. 12/414,236, mailed on Jul. 8, 2014, Vippagunta et al., "Querying for User Account Information", 14 pages.

PCT International Search Report and Written Opinion for PCT Application No. PCT/US07/76920 mailed on May 2, 2008, 13 pages.

Office Action for U.S. Appl. No. 12/353,170, mailed on Mar. 2, 2015, Steven Huynh, "Phrase Feedback Loop", 12 pages.

(56) References Cited

OTHER PUBLICATIONS

Office Action for U.S. Appl. No. 13/829,435, mailed on Oct. 7, 2015, Agarwal et al., "Utilizing Phrase Tokens in Transactions", 21 pages.
Office Action for U.S. Appl. No. 13/828,841, mailed on Oct. 8, 2015, Agarwal et al., "Utilizing Phrase Tokens in Transactions", 19 pages.
Office action for U.S. Appl. No. 14/312,924 mailed on Nov. 3, 2015, Sellier et al., "Sharing Media Items With Pass Phrases", 48 pages.
Office action for U.S. Appl. No. 12/414,236, mailed on Sep. 21, 2015, Vippagunta et al., "Querying for User Account Information", 23 pages.
Office action for U.S. Appl. No. 12/353,170, mailed on Sep. 24, 2015, Huynh et al., "Phrase Feedback Loop", 10 pages.
Office action for U.S. Appl. No. 12/544,891, mailed on Mar. 10, 2016, Williams et al., "Enforcing User-Specified Rules", 22 pages.
Office action for U.S. Appl. No. 12/353,025, mailed on Mar. 18, 2016, Jessensky et al., "Generating Personalized Phrases", 29 pages.
Office action for U.S. Appl. No. 12/414,236, mailed on Jun. 2, 2016, Vippagunta et al., "Querying for User Account Information", 17 pages.
Final Office Action for U.S. Appl. No. 12/353,025, mailed on Apr. 28, 2015, James Jesnsky, "Generating Personalized Phrases", 12 pages.
Office Action for U.S. Appl. No. 14/312,924, mailed on May 7, 2015, Laurent E. Sellier, "Sharing Media Items With Pass Phrases", 51 pages.
Office action for U.S. Appl. No. 12/510,761, mailed on May 8, 2015, Jesensky et al., "Determining Similar Phrases", 24 pages.
Riloff et al., "Learning Extraction Pattern for Subjective Expressions", Proceedings of the 2003 Conference on Empirical Methods in Natural Language Processing, 2003, 8 pages.
Final Office Action for U.S. Appl. No. 12/353,184, mailed on Jun. 16, 2015, Howard B. Gefen, "Using Phrase Tokens for Performing Transactions", 29 pages.
Final Office Action for U.S. Appl. No. 11/548,111, mailed on Jun. 17, 2015, Amit D. Agarwal, "Utilizing Phrase Tokens in Transactions", 20 pages.
Office action for U.S. Appl. No. 12/544,891 mailed on Aug. 25, 2015, Williams et al., "Enforcing User-Specified Rules", 18 pages.

\* cited by examiner

700 ⟶

| Select a Phrase |
|---|
| ← → ✖ ⟳ 🏠 🔍 Search ★ |
| http://www.site.com/yourphrases_user102(1) |

Your Phrases
Add a new Phrase to your Payments account, or edit existing Phrases below.

Security Settings:
- Allow order approval without signing in
- Review and change your Phrase security settings ( Add a New Phrase ) ⟵ 704

⟵ 702

| Phrase | Payment Method | Shipping Address | Status | Actions |
|---|---|---|---|---|
| Fresh Tracks<br>Mobile approval on | Visa<br>Last 4 digits: 7064 | Brian J. Brown<br>1113 E. Lincoln St.<br>Elk, WA 78065<br>Phone: 202-355-5015 | Active | ( EDIT ) ( DELETE ) |
| Brian's Fun Cash<br>Mobile approval on | MasterCard<br>Last 4 digits: 5555 | Brian J. Brown<br>1113 E. Lincoln St.<br>Elk, WA 78065<br>Phone: 202-355-5015 | Active | ( EDIT ) ( DELETE ) |
| Christmas Fund<br>Mobile approval on | Visa<br>Last 4 digits: 7064 | Brian J. Brown<br>1113 E. Lincoln St.<br>Elk, WA 78065<br>Phone: 202-355-5015 | Active | ( EDIT ) ( DELETE ) |
| Snow Ghost<br>Mobile approval on | Checking Account<br>Last 4 digits: 4566 | Brian J. Brown<br>1113 E. Lincoln St.<br>Elk, WA 78065<br>Phone: 202-355-5015 | Active | ( EDIT ) ( DELETE ) |
| Left on the Lights<br>Mobile approval on | Gift Card<br>Last 4 digits: 8789 | Brian J. Brown<br>1113 E. Lincoln St.<br>Elk, WA 78065<br>Phone: 202-355-5015 | Active | ( EDIT ) ( DELETE ) |

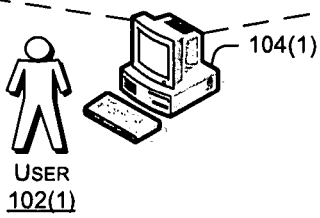

USER
102(1)

Fig. 7

GENERATING CONSTRUCTED PHRASES

RELATED APPLICATIONS

This application incorporates by reference U.S. Provisional Application No. 60/823,611, filed on Aug. 25, 2006, and U.S. patent application Ser. No. 11/548,111, filed on Oct. 10, 2006, both entitled UTILIZING PHRASE TOKENS IN TRANSACTIONS.

BACKGROUND

Companies utilizing e-commerce sites strive to make their sites easier for users to locate and purchase items. In order to ease users' ability to purchase items, for instance, these companies may configure their sites to accept many forms of payment. While many of these strategies have increased the effectiveness of these sites, companies continually strive to further enhance user experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

FIG. 7 illustrates another example user interface served by the content provider of FIGS. 1 and 2. This interface illustrates each phrase that has been associated with a particular user.

DETAILED DESCRIPTION

Figure 1:
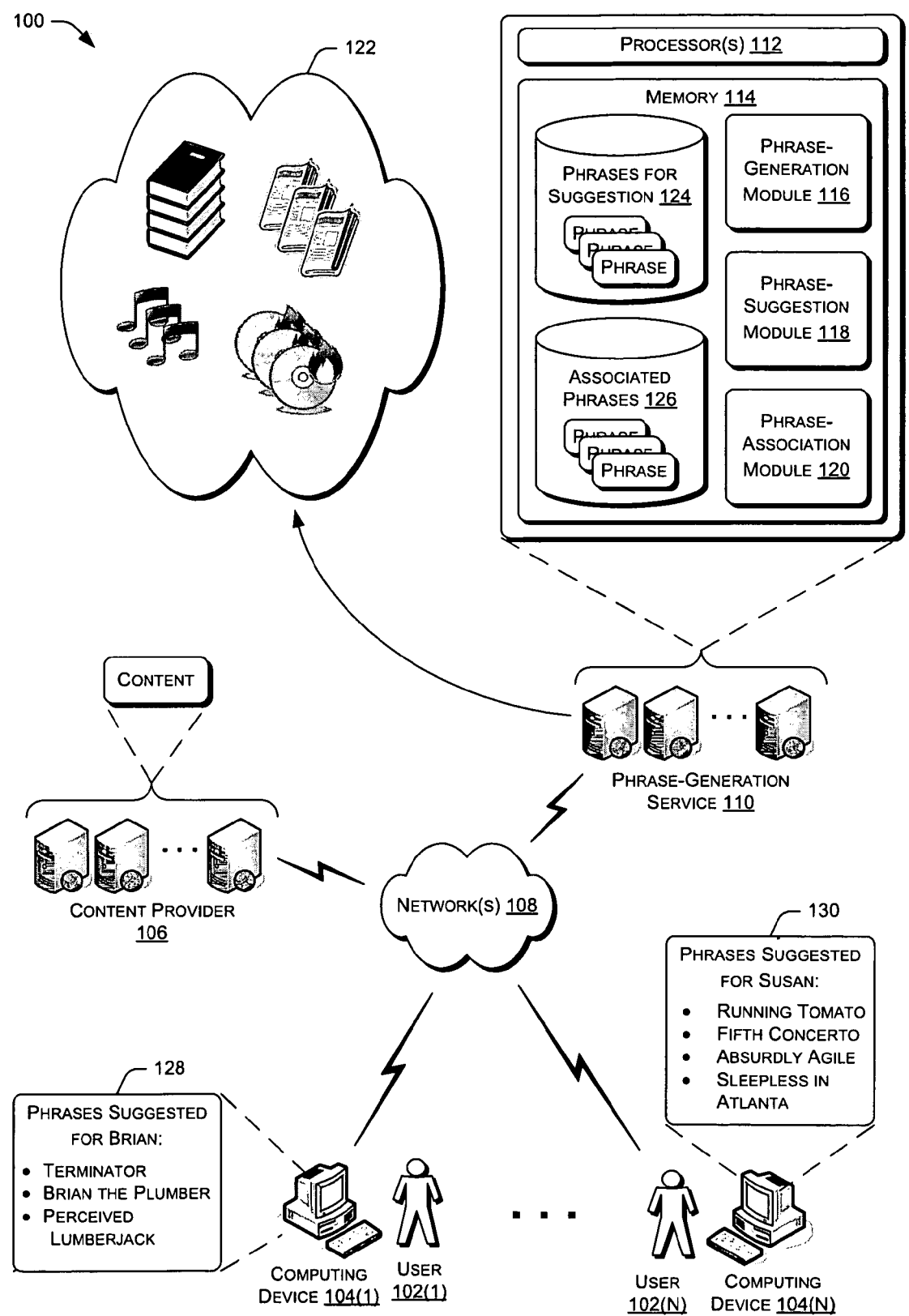
FIG. 1 illustrates an example architecture that includes a phrase-generation service for generating phrases. Once the phrases are generated, some of the phrases may be suggested to one or more users.

This disclosure is directed, in part, to generating phrases. These generated phrases may be for association with an entity, such as a user or a user account. These phrases may additionally or alternatively be output for use as identifiers. In one particular instance, a user may select a generated phrase for association with the user and with an aspect of a user account that is used to execute a payment transaction. For instance, the selected phrase may be associated with a payment instrument associated with the user account, a location (e.g., a shipping address or a digital location) associated with the user account, a delivery method associated with the user account, or any other aspect of the user account. By associating the phrase in this manner, the user may then use the phrase to conduct transactions with use of the phrase. For instance, the user could purchase or receive an item from a merchant with the use of the phrase, or the user could similarly engage in any other sort of transaction with use of the phrase. As such, these generated phrases may operate similarly or the same as the transaction phrase tokens described in the related applications, incorporated by reference above.

In some instances, a phrase that is associated with a payment instrument is free from information identifying the aspect of the user account, such as the payment instrument associated with user account. Therefore, the user associated with the phrase may more freely share the phrase than an actual identifier of the payment instrument. That is, the user may more freely share the phrase that is associated with the payment instrument when compared with the sharing of credit card numbers, bank account numbers, gift card numbers, and the like.

In some instances, the generated phrases comprise a set of numeric or alphanumeric characters having a secondary meaning to the user (e.g., "Grace's Textbooks," "Griffin's Toys," etc.). Furthermore, in some instances, each of the generated phrases may comprise at least one word. In still other instances, each of the phrases may comprise between two and seven words, and may be free of numbers, symbols and the like. As such, these phrases may comprise a number of grammatically-correct words.

To generate these phrases, the described techniques may analyze one or more sources. These sources may include books, magazines, online content, audio content, video content and/or any other source from which words may be extracted or assembled. With use of the sources, the described techniques may extract phrases or may extract words for use in creating phrases.

Once the first corpus of phrases has been created by analyzing the sources, the techniques may filter the phrases to create a second corpus of phrases comprising fewer phrases than the first corpus of phrases. While the phrases may be filtered in any number of ways, in some instances the techniques attempt to filter out phrases that users would perceive as less interesting, harder to remember, difficult to pronounce, and/or the like. As such, the second corpus of phrases may comprise phrases that make "good" phrases for selection. Stated otherwise, users may be more likely to perceive these phrases as interesting, easier to remember, or the like as compared to the filtered-out phrases.

After filtering and creation of the second corpus of phrases, the described techniques may suggest phrases to one or more users. These users may then, for instance, select one or more of these phrases for association with the user and, potentially, with a payment instrument of the user or another aspect of a user account. Conversely, these phrases may be used as a writing tool (e.g., to help an author with lyrics for a song, poem, or the like), as a naming tool (e.g., to help a user think of names for an entity, such as a band, business, restaurant, or the like) or in any other manner where phrase generation may be helpful.

In some instances, the techniques suggest phrases that are personalized to a user. For instance, the techniques may determine one or more keywords that are associated with a user. These keywords may be manually inputted by a user or the keywords may be determined based on known information about the user (e.g., name, address, purchase history, etc.). After determination of the keyword(s), the techniques may determine phrases of the second corpus of phrases that are associated with the keyword(s). After making this determination, the techniques may suggest one or more of these phrases. For instance, if a user is known to be a skier (and, hence, is associated with a keyword "ski"), then phrases such as "powder hound," "black diamond," and "Winter Olympics" may be suggested to the user.

The discussion begins with a section entitled "Illustrative Architectures," which describes two non-limiting environments in which a phrase-generation service generates and provides phrases for user selection. A section entitled "Illustrative User Interfaces" follows. This section depicts and describes examples of user interfaces (UIs) that may be served to and rendered at the devices of the users of FIG. 1. Next, a section entitled "Illustrative Phrase-Generation Service" describes example components of a service that generates and provides phrases for use in the illustrated architectures of FIGS. 1 and 2 and elsewhere. A fourth section, entitled "Illustrative Flow Diagrams," describes and illustrates processes for generating and suggesting phrases, determining phrases that are related to statistically improbable phrases, and altering suggested phrases with use of a feedback loop. The discussion then concludes with a section entitled "Illustrative Processes" and a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architectures

FIG. 1 illustrates an example architecture 100 in which phrases may be generated and suggested to one or more users. Users may then select one or more of these phrases for use as identifiers or otherwise. In some instances, a user may select a phrase for association with the user and with one or more aspects of a corresponding user account. In some instances, these one or more aspects may be helpful in allowing the user or another user to execute (e.g., initiate, complete, participate in, or otherwise aid) a payment transaction with use of the phrase. As such, the phrase may be associated with a payment instrument associated with the user or user account, a location associated with the user or user account, or a delivery method associated with the user or user account. As such, the user or another entity may conduct transactions with use of the phrase, while any cost associated with the transaction may be charged to the underlying associated payment instrument. As discussed in detail below, the selected phrase may be free from information identifying the associated aspect of the user account (e.g., the payment instrument) and may, in some instances, comprise one or more words that collectively have a secondary meaning to the user.

In the illustrated embodiment, the techniques are described in the context of users 102(1), . . . , (N) operating computing devices 104(1), . . . , (N) to access a content provider 106 over a network 108. For instance, user 102(1) may use device 104(1) to access provider 106 for purposes of consuming content offered by the content provider or engaging in a transaction with the content provider.

In architecture 100, content provider 106 may comprise any sort of provider that supports user interaction, such as social networking sites, e-commerce sites, informational sites, news and entertainment sites, and so forth. Furthermore, while the illustrated example represents user 102(1) accessing content provider 106 over network 108, the described techniques may equally apply in instances where user 102(1) interacts with the content provider over the phone, via a kiosk, or in any other manner. It is also noted that the described techniques may apply in other client/server arrangements, as well as in non-client/server arrangements (e.g., locally-stored software applications, set-top boxes, etc.).

Here, user 102(1) accesses content provider 106 via network 108. Network 108 may include any one or combination of multiple different types of networks, such as cable networks, the Internet, and wireless networks. User computing devices 104(1)-(N), meanwhile, may be implemented as any number of computing devices, including as a personal computer, a laptop computer, a portable digital assistant (PDA), a mobile phone, a set-top box, a game console, a personal media player (PMP), and so forth. User computing device 104(1) is equipped with one or more processors and memory to store applications and data. An application, such as a browser or other client application, running on device 104(1) may facilitate access to provider 106 over network 108.

As illustrated, content provider 106 may be hosted on one or more servers having processing and storage capabilities. In one implementation, the servers might be arranged in a cluster or as a server farm, although other server architectures may also be used. The content provider is capable of handling requests from many users and serving, in response, various content that can be rendered at user computing devices 104(1)-(N) for consumption by users 102(1)-(N).

Architecture 100 also includes a phrase-generation service 110 configured to generate and provide phrases for selection by users 102(1)-(N). These phrases may be used when users 102(1)-(N) engage in transactions (e.g., with content provider 106) or otherwise. As discussed above, in some instances, user 102(1) may select a phrase for association with the user and with one or more aspects of a user account, such as a payment instrument of the user or with another user or entity. User 102(1) may then use this phrase to conduct a transaction (e.g., purchase, rent, lease, or otherwise consume content) from content provider 106 and/or with other content providers.

As illustrated, phrase-generation service 110 includes one or more processors 112 as well memory 114. Memory 114 includes a phrase-generation module 116, a phrase-suggestion module 118 and a phrase-association module 120. Phrase-generation module 116 functions to analyze one or more sources 122 to determine phrases and/or to determine words for creation into phrases. Sources 122 may include books, newspapers, magazines, audio content, video content and/or any other source from which a corpus of text may be determined. Books may include, for instance, fiction books, non-fiction books, encyclopedias, dictionaries, and any other type of bound or electronic book. Once module 116 has created and/or mined a corpus of phrases, these phrases may be stored in a database 124 for suggestion. A database 126, meanwhile, represents that some of these generated phrase may be associated with users, as discussed below.

Phrase-suggestion module 118 takes phrases from database 124 and suggests one or more phrases to one or more users. In some but not all instances, phrase-suggestion module 118 suggests phrases that are personalized to the user to whom the phrases are suggested. FIG. 1, for instance, illustrates that computing device 104(1) of user 102(1) renders a user interface 128 that includes three suggested phrases provided by module 118. While user interface 128 may include content provided by content provider 106, this interface may also include the phrases suggested by module 118 of phrase-generation service 110. Furthermore, in some instances, some or all of the phrases that user interface 128 illustrates have been personalized to user 102(1) who, in the illustrated example, is named Brian. The suggested phrases on user interface 128 include "Terminator," "Brian the Plummer," and "Perceived Lumberjack." While module 118 visually suggests these phrases to user 102(1) in the current example, module 118 may suggest these phrases in any other manner in other implementations (e.g., orally over the phone, in person, via an email or text message, etc.).

FIG. 1 also illustrates that computing device 104(2) of user 102(2) renders a user interface 130. Again, user interface 130 includes personalized phrases that phrase-suggestion module 118 provides. Here, module 118 suggests the following phrases for user 102(N), whose example name and city of residence is Susan and Atlanta, Ga., respectively: "Running Tomato," "Fifth Concerto," "Absurdly Agile," and "Sleepless in Atlanta."

Once user 102(1) or user 102(N) select a phrase, phrase-association module 120 may associate this selected phrase with the corresponding user. Furthermore, in some instances, phrase-association module 120 associates the selected phrase with a payment instrument of the user. In still other instances, phrase-generation service 110 may not include phase-association module 120. Instead, phrase-generation service may merely generate and provide phrases for output for a variety of other reasons, such as for helping users choose an identifier (e.g., for a rock band), for helping users write poems or songs, or for any other reason. Furthermore, while content provider 106 and phrase-generation service 110 are illustrated in the current example as separate entities, provider 106 and service 110 may comprise the same entity or may employ similar or the same functionality in other embodiments. Furthermore, the described techniques themselves may be implemented in a vast number of other environments and architectures.

Figure 2:
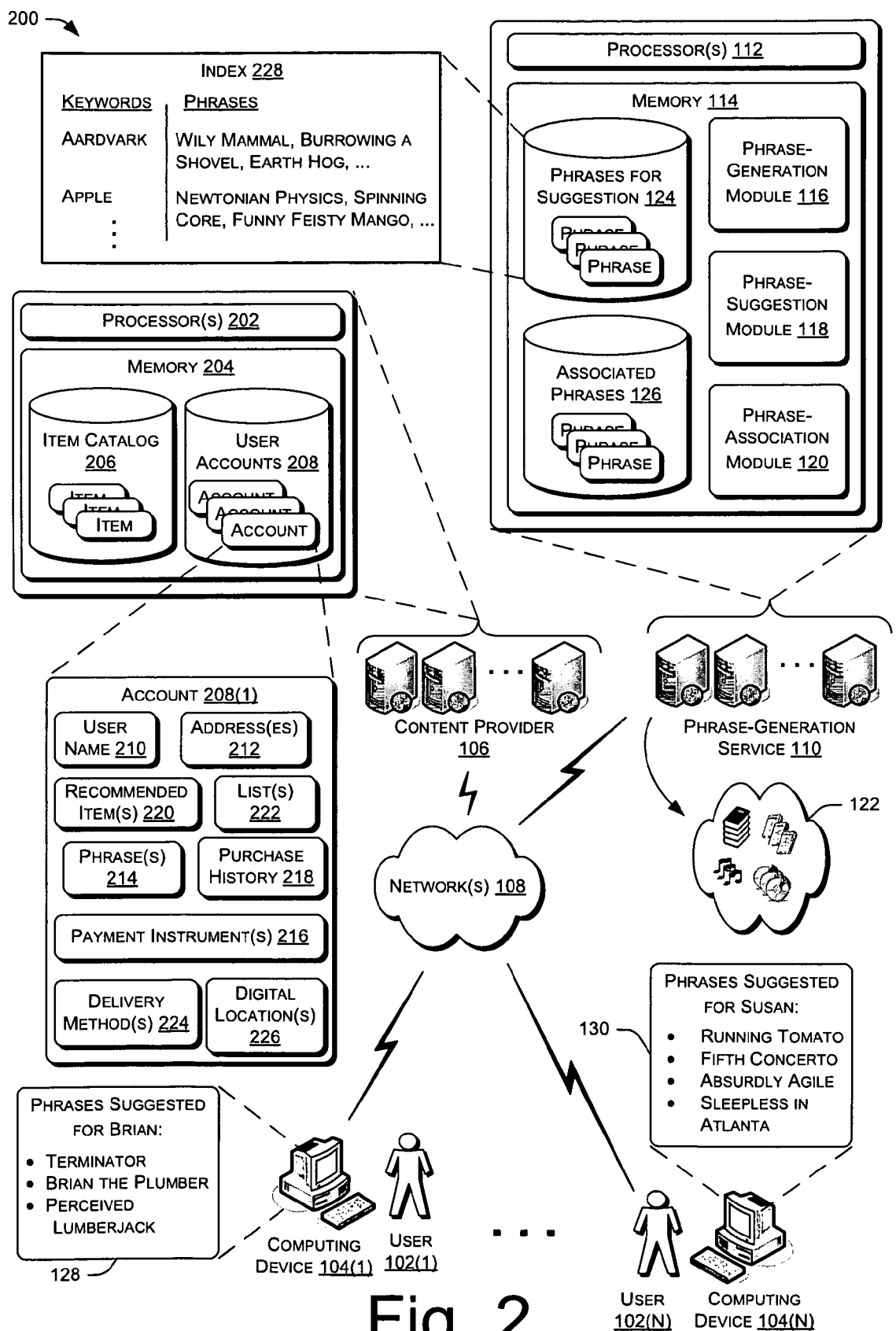
FIG. 2 illustrates another example architecture that includes the phrase-generation service of FIG. 1. Here, the architecture includes a content provider that stores information about the users to whom the phrases are suggested.

FIG. 2 illustrates another architecture 200 in which phrase-generation service 110 may generate and suggest or otherwise provide the generated phrases. In this example, users 102(1)-(N) select phrases suggested by service 110 for the purpose of conducting transactions with content provider 106. Furthermore, architecture 200 represents that phrase-generation service 110 may suggest phrases that are personalized to particular users based on information stored at or accessible by content provider 106. For instance, content provider 106 may have access to previously-known information about user 102(1), which service 110 may use to suggest phrases to user 102(1). In still other instances, service 110 may personalize these phrases based on information that user 102(1) manually or explicitly provides.

As illustrated, the servers of content provider 106 include one or more processors 202 and memory 204. Memory 204 stores or otherwise has access to an item catalog 206 comprising one or more items that provider 106 may provide to users 102(1)-(N) via a transaction with users 102(1)-(N). An item includes anything that the content provider wishes to offer for purchase, rental, subscription, viewing, informative purposes, or some other form of consumption. In some embodiments, the item may be offered for consumption by the content provider itself, while in other embodiments content provider 106 may host items that others are offering via the provider. An item can include a product, a service, a digital download, a news clip, customer-created content, information, or some other type of sellable or non-sellable unit.

Memory 204 also includes or has access to a user-accounts database 208. Database 208 includes information about users (e.g., users 102(1)-(N)) who have a user account at content provider 106 or who have otherwise engaged in some sort of transaction with provider 106. As discussed above, service 110 may suggest personalized phrases to users based on information stored in or accessible by user-accounts database 208.

An example user account 208(1) is associated with user 102(1) and, as illustrated, aspects of the user account may include a name of the user 210, one or more addresses 212 of the user, one or more phrases 214 that have previously been associated with the user, one or more payment instruments 216 of the user that have been associated with account 208(1), a purchase history or information about a purchase history 218 of the user, items that have been recommended or information about items that have been recommended 220 for the user, and lists or information about lists 222 that are associated with the user. Account 208(1) may also include one or more specified delivery methods 224 and/or one or more specified digital locations 226. It is specifically noted that while a few example aspects or elements of user account 208(1) have been provided other embodiments may provide more or fewer elements.

Here, user name 210 may specify the legal name of user 102(1) (e.g., "Brian Brown"). Additionally or alternatively, user name 210 may specify a screen name (e.g., "BBrown18") that user 102(1) uses when communicating with content provider 106. Furthermore, addresses 212 may include a shipping address of user 102(1), a billing address of user 102(1), or any other address associated with user 102(1). Again, phrases 214 may include any phrases (e.g., "Brian's Fun Cash") that have previously been associated with user account 208(1), as well as potentially with one or more of the user's associated payment instrument(s) 216.

Purchase history 218, meanwhile, may include information about previous transactions between user 102(1) and content provider 106. Purchase history 218 may also, potentially, include information about transactions between user 102(1) and other content providers. This information may include names of items that user 102(1) purchased, tags that users or provider 106 has associated with these items (and tags related to those tags), categories in item catalog 206 in which the purchased items reside, a time of the day or a season when user 102(1) typically purchases items, or any other information evinced explicitly or implicitly from the user's documented purchase history.

Similarly, recommended items 220 may include any information about items that other users, provider 106, or any other entity has previously recommended for user 102(1). Again, this information may include a name of the items, categories of the items, tags and related tags that are associated with the items, and any other information that may be evinced from these recommendations. Content provider 106 may store similar information about any lists 222 that user 102(1) has created or is otherwise associated with (e.g., names and categories of items on the lists, tags associated with the items and the lists, etc.).

Next, user account 208(1) may specify delivery method(s) 224 selected by the associated user. These methods may specify that the user prefers to send and/or receive items via standard mail, express mail, two-day mail, overnight mail, or via any other delivery method. Digital location(s) 226, meanwhile, may specify a location where the associated user wishes to receive (and/or send) digital items, such as to a particular computing device or location on a server. For instance, if the user purchases or is gifted a digital item, such as a song, digital location 226 may specify a device or destination at which the user would like to receive the song. Furthermore, digital location(s) 226 may specify where the user wishes to receive money that is gifted to the user. For instance, this may include a bank account, an online user account, or any physical or electronic location where the user may receive money.

With reference now to phrase-generation service 110, FIG. 2 illustrates that service 110 may maintain an index 228 that logically maps keywords to phrases of phrase database 124 (and/or of phrase database 126). These keywords may comprise the words that together comprise the generated phrases, as well any other word. As illustrated, index 228 maps the keyword "Aardvark" to "Wily Mammal," "Burrowing a Shovel," and "Earth Hog," amongst others. Similarly, index 228 maps the keyword "Apple" to "Newtonian Physics," "Spinning Core," and "Funny Feisty Mango," amongst others.

As discussed above, phrase-generation service 110 may suggest personalized phrases to users based on known information about the users or based on manual inputs from the users. For instance, content provider 106 may provide information about user 102(1) from any of the information stored in user account 208(1). Service 110 may then view this received information as one or more keywords for insertion into index 228. Service 110 may then map the keyword(s) to one or more phrases in the index, which service 110 may then suggest to user 102(1).

For instance, envision that purchase history 218 of user account 208(1) shows that user 102(1) has purchased a large amount of snow-skiing equipment from content provider 106. Envision also that this purchased equipment falls into categories of the item catalog entitled "sports" and "ski." Also, the purchased equipment is associated with the tags "Powder Ski" and "downhill." Upon receiving this information, phrase-generation service 110 may treat the information as keywords for insertion into index 228. For instance, service 110 may insert some or all of the received words as keywords into index 228 for the purpose of determining phrases that are associated with these keywords.

In some instances, service 110 ranks the returned phrases that are associated with the inputted keywords. For instance, service 110 may rank highest the phrases that are associated with each (or most) of the keywords while ranking lowest the phrases that are associated with only one of the keywords. Additionally or alternatively, service 110 may rank these phrases based on the technique employed to create the phrase, as discussed below. In any event, service 110 may output the personalized phrases to user 102(1), which are likely to relate to skiing given the keywords inputted into index 228.

While the above example discussed that service 110 could input keywords associated with purchase history 218, any other information known about user 102(1) may be similarly inputted. For instance, name 210 or address 212 of user 102(1) could be used as a keyword for insertion into index 228, as may be any information known about user 102(1), illustrated in user account 208(1) or otherwise.

Furthermore, phrase-generation service 110 may also provide personalized phrases based on manual or explicit input from users 102(1)-(N). For instance, user 102(1) may provide one or more keywords to service 110, which may then analyze index 228 to determine phrases that are associated with the provided keywords. For instance, if user 102(1) were to provide the keyword "Schwarzenegger," service 110 may return the phrase "Terminator," amongst others. In still other instances, service 110 may provide, to user 102(1), a mix of phrases that are personalized based on known information about user 102(1), personalized based on manually-inputted keywords, and phrases that are not personalized.

Illustrative User Interfaces

Figure 3:
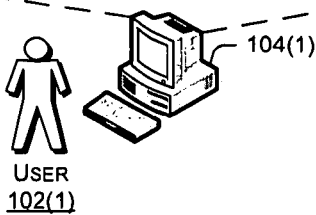
FIG. 3 illustrates an example user interface served by the content provider of FIGS. 1 and 2. Here, the example user interface includes multiple phrases that the phrase-generation service of FIGS. 1 and 2 has generated.

FIG. 3 illustrates an example user interface 300 served by content provider 106 of FIG. 2. Here, the example user interface includes multiple phrases 302 that phrase-generation service 110 of FIGS. 1 and 2 has generated. Furthermore, service 110 has personalized these generated and suggested phrases to user 102(1), although in other embodiments phrases 302 may not be personalized or these phrases may comprise a mix of personalized and non-personalized phrases.

In the current example, content provider 106 provided previously-known information about user 102(1) (from user account 208(1)) to service 110. As discussed above, service 110 inputted this information as keywords into index 228 in order to suggest phrases 302. As discussed above, user account 208(1) indicates that user 102(1) has previously purchased skiing items and, as such, may be interested in skiing generally. Phrase-generation service 110 has accordingly entered these skiing-related keywords into index 228 and has returned phrases 302 that relate to skiing (e.g., "Ski Bum," "Black Diamond," "Powder," etc.).

User 102(1) may selected one of suggested phrases 302 or, conversely, may type one or more words into a text box 304 for use as a phrase. In the former instance, when user 102(1) selects a phrase from phrases 302, the selected phrase may appear in text box 304. Additionally, the words that compose the selected phrase may themselves be inserted as keywords into index 228 of service 110, and the illustrated list of phrases 302 may change to reflect phrases that are related to the new keywords, as discussed in detail below.

Similarly, if user 102(1) types one or more words into text box 304, then service 110 may again input these words as keywords into index 228. Similar to the discussion above, the list of phrases 302 may again change to reflect phrases that are related to the newly-inputted keywords. Again, the following figures and accompanying discussion illustrate and describe this in detail.

Once user 102(1) has typed or selected a phrase that he or she wishes to keep, user 102(1) may select an icon 306 (entitled "Add this Phrase to Your Account") and the phrase that currently resides in text box 304 may be associated with user account 208(1). In certain embodiments, this phrase may also be associated with one or more payment instruments (e.g., payment instruments 216 or one or more other payment instruments) as described U.S. Provisional Application No. 60/823,611 and U.S. patent application Ser. No. 11/548,111.

In these instances, user 102(1) may use the associated phrase as a proxy for the associated or linked payment instrument. For example, this phrase may link with a payment instrument (e.g., a credit card) of user 102(1) or some other person or entity. Therefore, user 102(1) (and potentially one or more other users) may employ this phrase as a payment method for future purchases or other types of transactions. Additionally, user 102(1) (or some other user) may choose to associate certain rules to the selected phrase. These rules may, for instance, dictate when and how user 102(1) (and, potentially, other users) may use the phrase for purchases or otherwise. As illustrated, user interface 300 includes an area 308 where user 102(1) may decide whether the selected phrase can be used to both place and receive orders, or whether the phrase can only be used to receive gifts from other people.

Some rules may dictate which user actually controls the phrase (e.g., the person associated with the underlying payment instrument, such as the credit card holder). For instance, a mother may create a phrase for her daughter ("Grace") entitled "Grace's Textbooks". Once the mother creates or approves creation of the phrase, Grace may then specify this phrase as a payment method. By identifying this phrase as a payment method, the daughter thus identifies the mother (i.e., the person associated with the linked payment instrument) as the payer for these purchases.

Similar to the discussion above, this phrase may be associated with predefined rules. For instance, the mother may create a rule that pre-approves purchases of certain categories of items, such as textbooks. The mother may also employ other rules, such as dollar amounts, time limits, and the like. In these instances, when the daughter uses the phrase as a payment method, the transaction processing service 110 may compare the parameters of the requested purchase with the rules associated with the phrase. The service may then complete or cancel the requested purchase according to the phrase's rules. Conversely or additionally, content provider 106 may contact the user that controls use of the phrase (here, the mother) to request that he or she approve or deny the requested purchase. The user that controls the use of the phrase may, in some cases, be requested to authenticate themselves in some way, such as through a username and password in order to approve the transaction of the token user. However, because these phrases, such as phrases 302 shown in user interface 300, may merely be a string of characters that is free from information identifying a linked payment instrument, these phrases may be more freely shared than compared with other types of payment instrument identifiers, such as credit card numbers, bank account numbers, and the like.

After user 102(1) selects a rule from area 308, user 102(1) may also enter a default shipping address 310 and a default payment method 312 for association with the selected phrase. Default shipping address 310 specifies a default location where content provider 106 (or other content providers) should ship purchased items that user 102(1) (or another user) purchases with use of the selected phrase. Default payment method 312 similarly specifies a default payment instrument for use in these transactions. Finally, user interface 300 includes an area 314 that allows user 102(1) to choose where a content provider should send approval messages in response to these transactions, should an explicit approval be needed.

Figure 4:
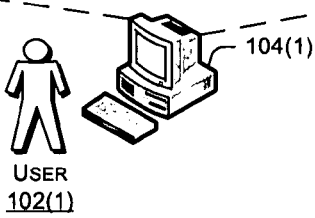
FIG. 4 illustrates an example user interface after the user has entered words into a text box of the user interface from FIG. 3. As illustrated, in response to the entering of the words, the user interface now includes different phrases that are related to the entered words, as well as an indication that the entered words are available as a phrase.

FIG. 4 illustrates a user interface 400 served by content provider 106 after user 102(1) has typed words ("Trail Running Preferred") into text box 304. In response, phrase-generation service 110 has inserted these entered words as keywords into index 228 and has mapped these keywords to generated phrases. Service 110 has then provided these phrases 402 that are related to the entered keywords for rendering on user interface 400. As illustrated, phrases 402 tend to relate to some portion of "Trail Running Preferred," as they include "Amazingly Swift," "Unending Marathon," "Nervous Shoes" and others.

User interface 400 also includes an indication 404 that the words that user 102(1) entered into text box 304 are themselves available as a phrase. That is, user 102(1) may choose to associate the phrase "Trail Running Preferred" with user account 208(1) via selection of icon 306 ("Add this Phrase to Your Account"). Conversely, user 102(1) may choose to select one of phrases 402 for insertion into text box 304, in which case the user could then associate this phrase with user account 208(1) via selection of icon 306. User 102(1) could also choose to select an even newer set of phrases that are presented in response to the selection of the phrase from phrases 402, and so on.

Figure 5:
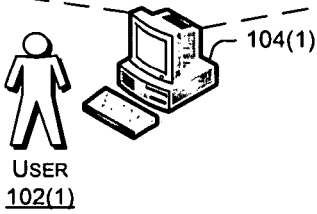
FIG. 5 illustrates another example user interface after the user has entered words into a text box of the user interface from FIG. 3. Again, this user interface now includes different phrases that are related to the entered words, as well as an indication that the misspelled word may not be used as a part of a selected phrase.

FIG. 5 illustrates another user interface 500 that content provider 106 serves in response to user 102(1) entering "Feilds of Onions" into text box 304. Again, user interface 500 includes a list of phrases 502 that relate to the entered words. However, user interface also includes an indication 504 that the word "feilds" may not be used as a part of a phrase, as this string of characters does not comprise a grammatically-correct English word. As such, user 102(1) may need to type the proper spelling ("Fields") into text box 304 if user 102(1) wishes to use "Fields of Onions" as a phrase. Of course, while some embodiments require that selected phrases comprise grammatically-correct words, other embodiments may allow for any string of alphanumeric characters. In some instances, phrases comprise at least two words separated by a space (as shown in FIGS. 3-5), while in other instances these words may not be separated (e.g., "SkiBum").

Figure 6:
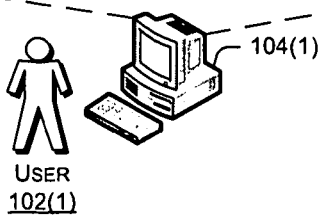
FIG. 6 illustrates another example user interface after the user has entered words into a text box of the user interface from FIG. 3. Again, this user interface now includes different phrases that are related to the entered words, as well as an indication that the entered words have previously been selected as a phrase by another user.

FIG. 6 illustrates another user interface 600 that content provider 106 serves in response to user 102(1) entering "Brian Brown" into text box 304. Similar to the discussion above, user interface 600 includes a list of phrases 602 related to the entered words. However, user interface also includes an indication 604 that the phrase "Brian Brown" has been taken by another user and, as such, user 102(1) may not select this phrase. As discussed in detail below, phrase-generation service 110 may also not suggest or allow selection of a phrase that sounds the same or similar to a taken phrase.

FIG. 7 illustrates an example user interface 700 entitled "Your Phrases," that content provider 106 serves in response to user 102(1) choosing to view his or her phrases 702. As illustrated, user 102(1) has five phrases associated with user account 208(1), with each phrase being associated with a particular payment instrument. With use of user interface 700, user 102(1) may choose to edit settings associated with one or more of his or her associated phrases. User 102(1) may also choose to "Add a New Phrase" to user account 208(1) via selection of an icon 704.

Illustrative Phrase-Generation Service

Figure 8:
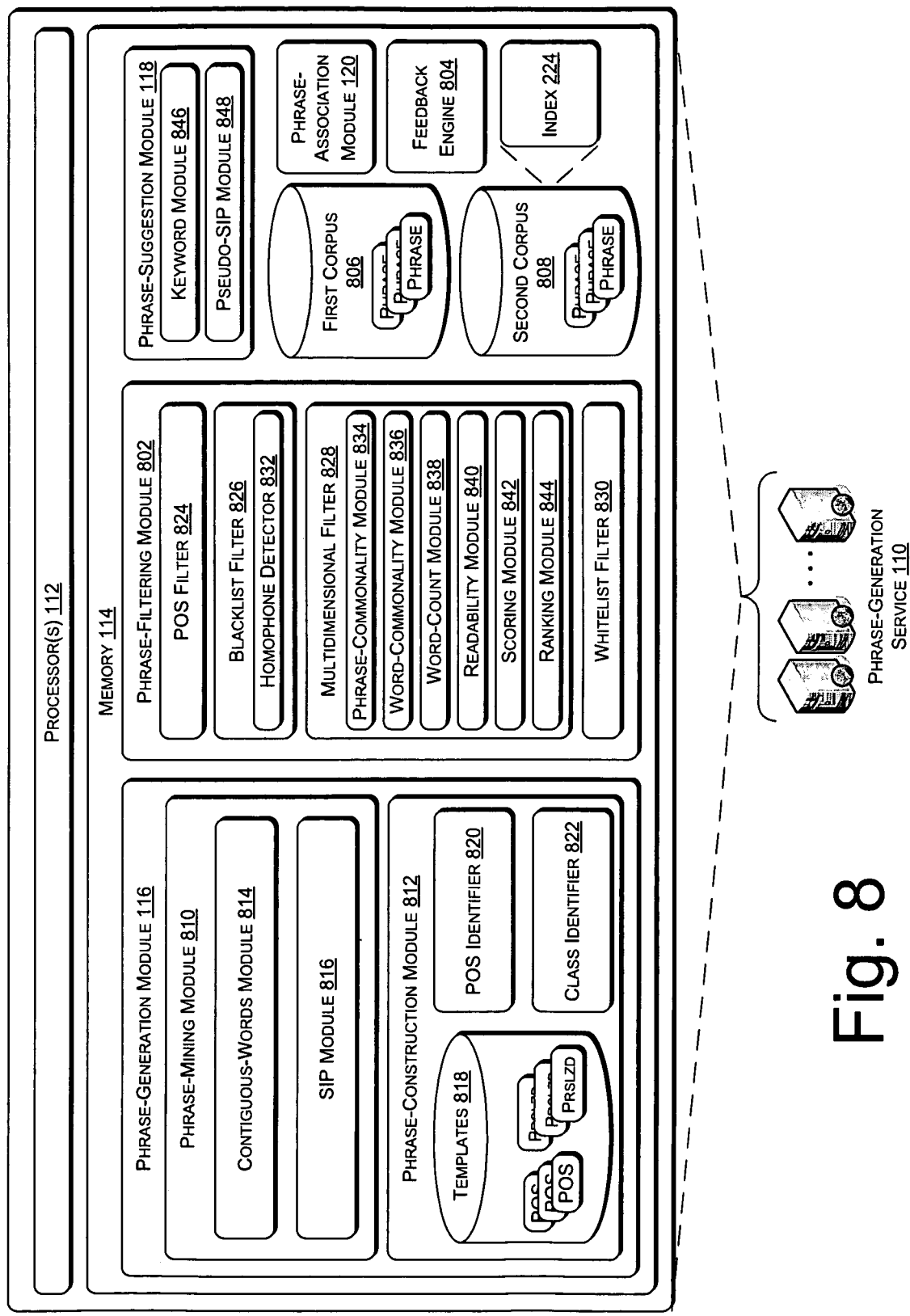
FIG. 8 illustrates example components of the phrase-generation service of FIGS. 1 and 2.

FIG. 8 illustrates example components of phrase-generation service 110 of FIGS. 1 and 2. As illustrated and as discussed above, service 110 includes phrase-generation module 116, phrase-suggestion module 118 and phrase-association module 120. Service 110 may also include a phrase-filtering module 802 and a feedback engine 804.

Phrase-generation module 116 functions to generate phrases, as discussed above, and store these generated phrases in a first corpus of phrases 806 that is stored on or accessible by service 110. Phrase-filtering module 802 functions to filter out one or more phrases from the first corpus, thus defining a second corpus of phrase 808 that typically comprises fewer phrases than first corpus 806. Phrase-suggestion module 118 may then suggest phrases of second corpus 808 to user 102(1)-(N), while phrase-association module 120 may associate selected phrases with these users. Finally, feedback engine 804 may monitor the characteristics of the phrases actually being selected by users 102(1)-(N) and, in response, cause phrase-suggestion module 118 to suggest phrases that more closely match these characteristics.

Phrase-generation module 116 may generate first corpus of phrases 806 by a variety of techniques. As illustrated, module 116 includes a phrase-mining module 810 and a phrase-construction module 812. Phrase-mining module 810 functions to mine multiple sources to determine phrases within the sources. Phrase-construction module 812, meanwhile, uses words found within the sources to construct phrases for storage in first corpus 806. In each instance, the sources from which the modules determine these phrases and words may include books, magazines, newspapers, audio content, video content or any other source that may comprise a corpus of text.

To find mined phrases, Phrase-mining module 810 includes a contiguous-words module 814 and a statistically-improbable-phrase (SIP) module 816. Contiguous-words module 814 analyzes corpuses of text from the sources to find phrases comprising two or more contiguous words. In some instances, module 814 locates words that are directly contiguous and, as such, are free from separation by punctuation. Module 814 may then store some or all of the determined phrases within first corpus 806. In one embodiment, contiguous-words module 814 locates phrases that comprise between two and seven directly-contiguous words.

For example imagine that module 814 mines a book that includes the following sentence: "The night was cold and dreary; the wind howled through rattling trees." Here, module 814 may determine and store the following phrases within corpus of phrases 806:

The Night
The Night Was
The Night Was Cold
The Night Was Cold And
The Night Was Cold And Dreary
Night Was
Night Was Cold
Night Was Cold And
Night Was Cold And Dreary
Was Cold
Was Cold And
Was Cold And Dreary
Cold And
Cold And Dreary
And Dreary
The Wind
The Wind Howled
The Wind Howled Through
The Wind Howled Through Rattling
The Wind Howled Through Rattling Trees
Wind Howled
Wind Howled Through
Wind Howled Through Rattling
Wind Howled Through Rattling Trees
Howled Through
Howled Through Rattling
Howled Through Rattling Trees
Through Rattling
Through Rattling Trees
Rattling Trees As this list illustrates, module 814 may mine phrases comprising contiguous words that are not separated by punctuation. By doing so, module 814 is more likely to determine phrases that make grammatical sense, and each of the phrases comprise words that have been placed next to one another in an authored work. In instances where the source comprises an edited work, such as book, magazine, or the like, module 814 may additionally rely on the fact that a copy editor or the like has proofread this source and, as such, may determine to a high degree of certainty that the determined phrases comprise words that make sense when placed next to one another.

Next, SIP module 816 mines one or more sources to determine whether any of these sources contain one or more statistically improbable phrases (SIPs). Statistically improbable phrases comprise phrases of two or more words (possibly capped at a number, such as seven) that occur in a corpus of text a statistically improbable number of times. For instance, a biography about Beethoven may contain the phrase "Fifth Concerto" a statistically improbable number of times. As such, SIP module 816 may determine that "Fifth Concerto" is a SIP for this biography and, as such, may store this and other SIPs in first corpus of phrases 806.

Phrase-construction module 812, meanwhile, constructs phrases from words and includes a database of templates 818, a part-of-speech (POS) identifier 820 and a class identifier 822. Database 818 may include varying types of templates, such as part-of-speech templates and personalized templates. Each part-of-speech template may comprise one or more placeholders, with each placeholder specifying a part-of-speech. With this template, phrase-construction module 812 may apply words having the associated part(s)-of-speech to the template to create one or more phrases. To do so, module 812 includes a part-of-speech (POS) identifier 820 to identify a part of speech for each word mined from a source.

For instance, if module 812 extracts the word "running" from a source, POS identifier 820 determines that this word comprises a verb and, more specifically, that this word comprises a gerund. With use of these POS or POS/class templates, module 812 may construct some or all of the possible phrases based on the templates and based on all of the words that module 812 has extracted from sources. Furthermore, because phrase-generation module 116 may analyze dictionaries, module 812 may create all or nearly all of the possible two-word phrases, three-word phrases, and so on.

With this in mind, envision that database 818 includes the following template that specifies the following placeholders:

[verb] [noun]

Phrase-construction module 812 may apply words having associated parts of speech to this template to create one or more phrases. For instance, module 812 may create (and store in corpus 806) phrases such as "Running Chair," "Dancing Pencil," "Vault Phone," "Act Hat."

Additionally, some or all of the part-of-speech templates within database 818 may include one or more placeholders that specify a describable class either in lieu of in or in addition to a particular part of speech. This describable class may specify any sort of characteristic that, when taken together with a part of speech, specifies a subset of the words associated with that particular part of speech. As such, phrase-construction module 812 may include a class identifier 822 that functions to categorize words within respective classes. Class identifier 822 may categorize these words based on lists that an operator of service 110 has manually entered, by reference to sources such as encyclopedias or dictionaries, or by any other suitable manner.

With this in mind, envision that database 818 specifies the following templates:

[gerund that describes movement] [noun that describes a fruit]
[noun that describes an occupation] [adverb] [verb that describes eating]
[preposition] the [noun that describes an article of clothing]

With use of the first template, module 812 may construct the following phrases, among many others: "Walking Mango," "Flying Pineapple," "Jogging Orange," and "Rolling Apple." With use of the second template, module 812 may construct, among many others, the following phrases: "Seamstress Quickly Bites" and "Plumber Patiently Chews." Finally, with use of the third template, module 812 could construct the following phrases "Beneath the Sweater," "Against the Clogs," or "During the Poncho."

In some embodiments, multiple different part-of-speech and/or part-of-speech and class combinations may be made based at least in part on the parts of speech listed below in Table 1.

TABLE 1

| Abbreviation: | Part of Speech: | Examples: |
|---|---|---|
| CC | Conjunction, coordinating | and, or |
| CD | Adjective, cardinal number | 3, fifteen |
| DET | Determiner | This, each, some |
| EX | Pronoun, existential there | There |
| FW | Foreign words | |
| IN | Preposition/Conjunction | for, of, although, that |
| JJ | Adjective | happy, bad |
| JJR | Adjective, comparative | happier, worse |
| JJJS | Adjective, superlative | happiest, worst |
| LS | Symbol, list item | A, A. |
| MD | Verb, modal | can, could, 'll |
| NN | Noun | aircraft, data |
| NNP | Noun, proper | London, Michael |
| NNPS | Noun, proper, plural | Australians, Methodists |
| NNS | Noun, plural | women, books |
| PDT | Determiner, prequalifier | quite, all, half |
| POS | Possessive | 's, ' |
| PRP | Determiner, possessive second | mine, yours |
| PRPS | Determiner, possessive | their, your |
| RB | Adverb | often, not, very, here |
| RBS | Adverb, superlative | Fastest |
| RBR | Adverb, comparative | Faster |

TABLE 1-continued

| Abbreviation: | Part of Speech: | Examples: |
|---|---|---|
| RP | Adverb, particle | up, off, out |
| SYM | Symbol | " |
| TO | Preposition | To |
| UH | Interjection | oh, yes, mmm |
| VB | Verb, infinitive | take, live |
| VBD | Verb, past tense | took, lived |
| VBG | Verb, gerund | taking, living |
| VBN | Verb, past/passive participle | taken, lived |
| VBP | Verb, base present form | take, live |
| VBZ | Verb, present 3SG -s form | takes, lives |
| WDT | Determiner, question | which, whatever |
| WP | Pronoun, question | who, whoever |
| WPS | Determiner, possessive & question | Whose |
| WRB | Adverb, question | when, how, however |
| PP | Punctuation, sentence ender | ., !, ? |
| PPC | Punctuation, comma | , |
| PPD | Punctuation, dollar sign | & |
| PPL | Punctuation, quotation mark left | " |
| PPR | Punctuation, quotation mark right | " |
| PPS | Punctuation, colon, semicolon, ellipsis | ;, . . . , - |
| LRB | Punctuation, left bracket | (, {, [ |
| RRB | Punctuation, right bracket | ), }, ] |

Furthermore, Table 2 illustrates illustrative parts-of-speech and class combinations that may be used in creating POS/class templates.

TABLE 2

| Combinations: | Description: |
|---|---|
| noun.act | nouns denoting acts or actions |
| noun.animal | nouns denoting animals |
| noun.artifact | nouns denoting man-made objects |
| noun.attribute | nouns denoting attributes of people and objects |
| noun.body | nouns denoting body parts |
| noun.cognition | nouns denoting cognitive processes and contents |
| noun.communication | nouns denoting communicative processes and contents |
| noun.event | nouns denoting natural events |
| noun.feeling | nouns denoting feelings and emotions |
| noun.food | nouns denoting foods and drinks |
| noun.group | nouns denoting groupings of people or objects |
| noun.location | nouns denoting spatial position |
| noun.motive | nouns denoting goals |
| noun.object | nouns denoting natural objects (not man-made) |
| noun.person | nouns denoting people |
| noun.phenomenon | nouns denoting natural phenomena |
| noun.plant | nouns denoting plants |
| noun.possession | nouns denoting possession and transfer of possession |
| noun.process | nouns denoting natural processes |
| noun.quantity | nouns denoting quantities and units of measure |
| noun.relation | nouns denoting relations between people or things or ideas |
| noun.shape | nouns denoting two and three dimensional shapes |
| noun.state | nouns denoting stable states of affairs |
| noun.substance | nouns denoting substances |
| noun.time | nouns denoting time and temporal relations |
| adj.all | all adjective clusters |
| adj.pert | relational adjectives (pertainyms) |
| adv.all | all adverbs |
| verb.body | verbs of grooming, dressing and bodily care |
| verb.change | verbs of size, temperature change, intensifying, etc. |
| verb.cognition | verbs of thinking, judging, analyzing, doubting |
| verb.communication | verbs of telling, asking, ordering, singing |
| verb.competition | verbs of fighting, athletic activities |
| verb.consumption | verbs of eating and drinking |

TABLE 2-continued

| Combinations: | Description: |
| --- | --- |
| verb.contact | verbs of touching, hitting, tying, digging |
| verb.creation | verbs of sewing, baking, painting, performing |
| verb.emotion | verbs of feeling |
| verb.motion | verbs of walking, flying, swimming |
| verb.perception | verbs of seeing, hearing, feeling |
| verb.possession | verbs of buying, selling, owning |
| verb.social | verbs of political and social activities and events |
| verb.stative | verbs of being, having, spatial relations |
| verb.weather | verbs of raining, snowing, thawing, thundering |
| adj.ppl | participial adjectives |

While Table 1 lists illustrative parts of speech that may be used to create templates within template database 818, it is to be appreciated that other embodiments may use more or fewer parts of speech. Similarly, while Table 2 lists illustrative part-of-speech/class combinations, other embodiments may use many other such combinations.

With these illustrative tables in mind, in one embodiment phrase-construction module 812 uses the following the parts-of-speech templates to construct phrases comprising parts-of-speech and/or parts-of-speech/class combinations:

[JJ] [NN]
[JJ] [NNS]
[NN] and [NNS]
[NN] and [NN]
[RB] [VRB]
[VRB] the [NNS]
[VRB] the [NN]

In addition to POS and POS/class templates, database 818 may also include one or more personalized (PRSLZD) templates. These templates may include one or more placeholders and/or one or more fixed or standard words. For instance, a personalized template may comprise one of the following:

[user's first name]'s Cash Barrel
Sleepless in [user's city of shipping address]
I love [keyword associated with user]
[keyword associated with user] [user's first name]

With reference to the first template, module 812 could reference user account 208(1) to determine the first name of user 102(1). After doing so, module 812 could construct the phrase "Brian's Cash Barrel" for suggestion and/or association with user 102(1). Similarly, module 812 could analyze a user account associated with user 102(N) to determine that this user's shipping address is in Atlanta, Ga. Module 812 could then construct a phrase "Sleepless in Atlanta" for this user. With reference to the third template, meanwhile, module 812 could construct a phrase "I Love Skiing" for a user who has previously purchased skis. Finally, the module could also construct the phrase "Skier Steve" for this same user, if his name were Steve.

Returning attention to FIG. 8, once phrase-generation module 116 has created first corpus of phrases 806, phrase-filtering module 802 may filter out a portion of these phrases to define second corpus 808. In some instances, phrase-filtering module 802 attempts to filter out less-desirable phrases from users' standpoints to define a corpus of "good" phrases. That is, module 802 attempts to filter out phrases such that the remaining phrases are perceived, on the whole, as more interesting to most users than compared to the filtered-out phrases. It is specifically noted that while the illustrated embodiment of phrase-generation service 110 filters out phrases, in other embodiments service 110 may instead positively identify "good" phrases. Furthermore, in some instances, certain phrases of first corpus 806 are not subject to the filtering process. In one embodiment, SIPs and personalized templates are not processed through at least a portion of the filtering process.

As illustrated, phrase-filtering module 802 includes a part-of-speech (POS) filter 824, a blacklist filter 826, a multidimensional filter 828 and a whitelist filter 830. Part-of-speech filter 824 functions to filter out at least a portion of the phrases of first corpus 806 based on the part-of-speech combinations of the phrases. That is, POS filter 824 may include a POS list that either specifies which POS combinations should be filtered out or a list that specifies which POS combinations should not be filtered out (in which case POS filter 824 may filter out those phrases whose combination does not fall on the list). In either instance, POS filter 824 removes a great many phrases of first corpus 806. Part-of-speech filter 824 may recognize the POS combinations of the phrases with use of existing algorithms and statistical models, such as the hidden Markov model (HMM).

Table 3, below, lists examples of templates that may be considered "good" POS combinations in some embodiments. Of course, templates that result in "good" phrases may vary based on context. In this instance, POS filter 824 may compare each phrase of first corpus 806 and may filter out those phrases that do not have a POS combination listed in Table 3.

TABLE 3

| CD-NNS | IN-NNS | IN-PRP | JJ-NN |
| --- | --- | --- | --- |
| JJ-NNS | JJ-VBG | JJR-NN | JJR-NNS |
| JJS-NN | JJS-NNS | NN-NN | NN-NNS |
| NN-POS-NN | NN-POS-NNS | NNS-POS-NN | NNS-POS-NNS |
| NNS-VB | NNS-VBD | NNS-VBG | NNS-VBN |
| NNS-VBP | PRPS-NN | PRPS-NNS | RB-JJ |
| RB-JJR | RB-JJS | RB-RBR | RB-VBD |
| RB-VBG | RB-VBN | RB-VBZ | RBR-NN |
| RBR-NNS | RBR-NNS | RBR-VBG | TO-VB |
| UH-NN | VB-NNS | VB-RB | VB-RB-VB |
| VBD-NN | VBD-NNS | VBD-RB | VBG-JJR |
| VBG-NN | VBG-NNS | VBG-RB | VBN-JJS |
| VBN-NN | VBN-NNS | VBN-RB | VBZ0NN |
| VBZ-RB | WPS-NNS | CD-IN-CD | CD-JJ-NNS |
| CD-JJS-NNS | CD-NN-NNS | CD-NNS-JJR | CD-NNS-RBR |
| CD-VBD-NNS | CD-VBG-NNS | CD-VBN-NNS | DET-JJ-NN |
| DET-JJ-NNS | DET-JJS-NN | DET-JJS-NNS | DET-NN-NN |
| DET-NN-POS-NNS | DET-VBG-NN | DET-VBG-NNS | DET-VBZ-RB-NN |
| JJ-CC-JJ | JJ-JJ-NN | JJ-JJ-NNS | JJ-JJ-UH |
| JJ-JJR-NNS | JJ-JJR-RB | JJ-JJS-NN | JJ-NN-NN |

TABLE 3-continued

| | | | |
|---|---|---|---|
| JJ-NN-NNS | JJ-NN-POS-NN | JJ-NN-POS-NNS | JJ-NN-POS-VB |
| JJ-PRP-VBP-NN | JJ-PRP-VBZ-JJ | JJ-TO-VBP | JJR-CC-JJR |
| JJR-IN-NN | JJR-JJ-NN | JJR-JJ-NNS | JJR-NN-NN |
| JJR-NN-NNS | JJR-NN-POS-NN | JJR-NN-POS-NNS | JJR-NNS-POS-NNS |
| JJR-RB-JJ | JJR-RB-RB | JJR-TO-NNS | JJR-WRB-JJ |
| JJS-CC-JJS | JJS-IN-NN | JJS-JJ-NN | JJS-JJ-NNS |
| JJS-NN-NN | JJS-NN-NNS | JJS-NN-POS-NN | JJS-NN-VBP-VBN |
| JJS-RB-JJ | JJS-TO-JJ | JJS-TO-VB | JJS-VBD-NNS |
| JJS-VBG-NN | JJS-VBN-NN | MD-NN-VB | MD-NNS-NN |
| MD-NNS-VB | MD-NNS-VBP | MD-PRP-NN | MD-PRP-VB |
| MD-RB-RB-JJ | MD-RB-RB-VBP | MD-RB-VB | MD-RB-VB-JJ |
| MD-RB-VB-JJR | MD-RB-VB-NN | MD-RB-VB-NNS | MD-RB-VB-VBG |
| MD-RB-VB-VBN | MD-RB-VBP | MD-RB-VBP-NN | MD-VB-RB-VBD |
| MD-VB-RB-VBN | MD-VB-VBN-CD | MD-VB-VBN-JJ | MD-VB-VBN-JJR |
| MD-VB-VBN-NN | MD-VB-VBN-NNS | MD-VB-VBN-VBN | MD-VBP-NNS |
| NN-CC-NN | NN-CC-NNS | NN-IN-NNS | NN-NN-POS-NN |
| NN-POS-CD-NNS | NN-POS-JJ-NN | NN-POS-JJR-NN | NN-POS-JJR-NNS |
| NN-POS-JJS-NN | NN-POS-JJS-NNS | NN-POS-NN-NN | NN-POS-RB-JJ |
| NN-POS-RB-NN | NN-POS-VBD-NN | NN-POS-VBG-JJR | NN-POS-VBG-NNS |
| NN-POS-VBN-NN | NN-RB-VB-JJ | NN-RB-VB-NN | NN-RB-VB-NNS |
| NN-VBG-UH | NN-VBZ-NNS | NN-VBZ-RB-JJ | NN-VBZ-RB-VBG |
| NN-WP-VBZ-JJ | NNS-CC-NNS | NNS-DET-VBZ-NN | NNS-IN-NNS |
| NNS-JJS-NN | NNS-JJS-NNS | NNS-MD-RB-VBP | NNS-NN-MD-VBD |
| NNS-NN-POS-NN | NNS-NN-VBP-VBG | NNS-POS-CD-NNS | NNS-POS-JJ-NN |
| NNS-TO-VBP | NNS-VBG-NN | NNS-VBP-RB-JJ | NNS-VBP-RB-NNS |
| PRP-JJ-UH | PRP-MDNN-NN | PRP-VBD-RB-NNS | PRP-VBD-RB-VB |
| PRP-VBN-NNS | PRP-VBP-JJ-NNS | PRP-VBP-JJR-JJ | PRP-VBP-NN-NNS |
| PRP-VBP-PRPS-NN | PRP-VBP-PRPS-NNS | PRP-VBP-RB-JJR | PRP-VBP-RB-NNS |
| PRP-VBP-RB-VBG | PRP-VBP-VBG-NN | PRP-VBZ-PRPS-NN | PRP-VBZ-RB-JJ |
| PRP-VBZ-RB-JJR | PRP-VBZ-RB-NN | PRP-VBZ-RB-NNS | PRPS-JJ-NN |
| PRPS-JJ-NNS | PRPS-JJ-UH | PRPS-JJS-NNS | PRPS-NN-NNS |
| PRPS-NN-POS-NN | PRPS-NN-POSNNS- | PRPS-NNS-NN | PRPS-VBD-NN |
| PRPS-VBG-NN | RB-CC-RB | RB-JJ-NN | RB-JJ-NNS |
| RB-JJR-VBD | RB-JJR-VBN | RB-MD-VB-NNS | RB-RB-JJ |
| RB-RB-VBN | RB-RBR-NN | RB-VB-RB-VBN | RB-VB-RB-VBP |
| RB-VBD-RB-JJ | RB-VBD-RB-NNS | RB-VBP-RB-JJ | RB-VBP-RB-VBN |
| RBR-CC-JJR | RBR-IN-NNS | RBR-NN-NN | TO-VBD-NN |
| TO-VBP-RB | UH-IN-JJ | UH-NN-POS-NN | UH-TO-NN |
| VB-CC-VB | VB-DET-NNS | VB-DET-UH | VB-DET-VBZ-NNS |
| VB-JJ-NNS | VB-JJR-NNS | VB-NN-NNS | VB-NN-POS-NN |
| VB-NN-POS-NNS | VB-NNS-POS-NN | VB-NNS-POS-NNS | VB-NNS-RB |
| VB-NNS-RBR | VB-PRP-MD-NN | VB-PRP-VBP-JJ | VB-PRP-VBP-NN |
| VB-PRP-VBP-NNS | VB-PRP-VBZ-JJ | VB-PRPS-NN | VB-RB-JJ-RB |
| VB-RB-NNS-VBP | VB-RB-PRP-VB | VB-RB-RB-JJ | VB-RB-RB-VBN |
| VB-RB-VB-NNS | VB-RB-VBD-NN | VB-RB-VBD-NNS | VB-VBN-RBS |
| VB-WP-VBZ-JJ | VB-WP-VBZ-VBN | VBD-CC-VBD | VBD-NN-JJR |
| VBD-NNS-POS-NNS | VBD-RB-JJ-NN | VBD-RB-JJ-RB | VBD-RB-VB-JJ |
| VBD-RB-VB-NNS | VBG-CC-VBG | VBG-CD-NNS | VBG-DET-NN |
| VBG-DET-UH | VBG-IN-NNS | VBG-JJR-NNS | VBG-NN-MD-NN |
| VBG-NN-MD-VBD | VBG-NN-POS-NN | VBG-NN-POS-NNS | VBG-NN-VBP-NN |
| VBG-NN-VBP-NN | VBG-NNS-POS-NNS | VBG-PRP-RBR | VBG-PRP-VBP-JJ |
| VBG-PRP-VBP-NN | VBG-PRP-VBZ-JJ | VBG-PRP-VBZ-NN | VBG-PRPS-NN |
| VBG-PRPS-NNS | VBG-RB-NNS | VBG-RB-RB | VBG-RB-VBZ-NNS |
| VBG-RBR-NNS | VBG-UH-NN | VBG-VB-VBZ-NN | VBG-VBD-NNS |
| VBG-VBN-NNS | VBG-VBN-RBR | VBG-VBZ-NNS | VBG-VBZ-RB-JJ |
| VBG-WP-VBZ-VBN | VBN-CC-VBN | VBN-DET-NNS | VBN-IN-NNS |
| VBN-JJR-NNS | VBN-JJS-NNS | VBN-NN-POS-NN | VBN-NN-POS-NNS |
| VBN-PRP-JJR | VBN-PRP-VBP-JJ | VBN-PRP-VBZ-NN | VBN-PRPS-NN |
| VBP-RB-NNS-JJ | VBP-RB-PRP-JJ | VBP-RB-PRP-VBD | VBP-RB-PRP- |
| VBP-RB-VBG-NN | VBZ-JJ-NNS | VBZ-PRP-VBP-JJ | VBZ-PRP-VBZ-JJ |
| VBZ-RB-PRP-JJ | VBZ-RB-RB-VB | VBZ-RB-VBG-JJ | VBZ-RB-VBG-NN |
| VBZ-RB-VBG-NNS | VBZ-WP-VBZ-JJ | WDT-VBD-RB-VB | WP-JJ-NN |
| WP-JJ-NNS | WP-VBZ-JJ-NN | WP-VBZ-JJR | WP-VBZ-JJR-JJ |
| WP-VBZ-JJS | WP-VBZ-NN | WP-VBZ-NN-POS-NN | WP-VBZ-NN-RB |
| WP-VBZ-NNS | WP-VBZ-PRPS-NN | WP-VBZ-RBS-JJ | WP-VBZ-VBG-JJ |
| WP-VBZ-JJS | WP-VBZ-NN | WP-VBZ-NN- | WP-VBZ-NN-RB |
| WP-VBZ-NNS | WP-VBZ-PRPS-NN | WP-VBZ-RBS-JJ | WP-VBZ-VBG-JJ |
| WPS-JJ-NN | WPS-JJ-NNS | WRB-NN-MD-NN | WRB-NN-VBP-JJ |
| WRB-NN-VBP-VBG | WRB-NN-VBP-VBN | WRB-NNS-VB | WRB-PRP-VBP-JJ |
| WRB-PRP-VBP-NNS | WRB-VBZ-JJ-NN | WRB-VBZ-PRPS-NN | WRB-VBZ-PRPS-NNS |

While Table 3 illustrates a few POS combinations that may be identified as good combinations, it is specifically noted that this list is merely illustrative. Furthermore, because phrases of the first and second corpuses may comprise any number of words (one or more), POS filter 824 may employ POS lists for each length of phrases. In one particular embodiment, phrases of the first and second corpuses of phrases are two to seven words in length.

Phrase-filtering module 802 further includes blacklist filter 826. Filter 826 may filter out phrases from first corpus 806 that the blacklist specifies or phrases that include words that appear on the blacklist. For instance, this filter may filter out trademarks, slogans, vulgarities, foreign words, or any other type of word or phrase that service 110 wises to specify for exclusion from second corpus 808.

For instance, blacklist filter 826 may filter out phrases that have already been taken. That is, filter 826 may filter out phrases that have already been associated with a user. In these instances, filter 826 may additionally include a homophone detector 832. Homophone detector 832 functions to determine all possible pronunciations of taken phrases and compare these pronunciations to all possible pronunciations of phrases that have not yet been associated with users. If any of the pronunciations sound the same or so similar as to cause confusion, then filter 826 may also filter out the phrases that sound similar to the already-taken phrases.

Multidimensional filter 828, meanwhile, functions to filter out phrases based on one or more of a variety of factors. In some instances, multidimensional filter 828 scores each phrase of the first corpus of phrases based on one or more of these factors. Filter 828 then filters out those phrases that score below a threshold or may use this scoring in other ways. For instance, filter 828 may use these scores as weights in order to filter out more phrases having lower scores than compared with higher scores.

As illustrated, filter 828 may include a phrase-commonality module 834, a word-commonality module 836, a word-count module 838, a readability module 840, a scoring module 842 and a ranking module 844. Phrase-commonality module determines, for each phrase of the first corpus, a commonality of the phrase. Each determined commonality may be relative to one another and may be based on how often the phrase is found during the original mining of the multiple sources (e.g., books, magazines, etc.) by phrase-generation module 116. Similarly, word-commonality module 836 may determine a commonality for each word of each phrase and assign a score to each phrase based on the determined word commonalities. Next, word-count module 838 may determine a number of words that compose each phrase of first corpus 806. Readability module 840 may determine a readability of the phrase based on, for instance, a number of syllables in the phrase and/or a number of syllables per word of the phrase. In some instances, this readability analysis may be based on indexes such as the Flesch-Kincaid Index or the Coleman-Liau Index.

With this information (and potentially other information), scoring module 842 may assign a score to each phrase of the first corpus. Ranking module 844 may then rank the phrases based on the determined scores. Filter 828 may filter out phrases based on the ranking or, conversely, may positively identify phrases to pass through to second corpus 808.

Because filter 828 is multidimensional, the scores of the phrases that are filtered out and/or the scores of the phrases that are passed through may be based on experimental data. For instance, phrase-generation service 110 may initially provide phrases to a plurality of test users to determine which phrases those users find interesting. Envision, for instance, that these users generally find uncommon, easy-to-read phrases comprising two common words to be interesting, while also finding four-word, difficult-to-read phrases with uncommon words uninteresting. In this example, ranking module 844 may rank much higher phrases that have scores similar to the former interesting phrases as compared with phrases that score close to the latter phrases.

Stated otherwise, the scores that scoring module 842 provides may segregate the phrases of first corpus 806 into regions. Ranking module 844 may then rank discrete regions or may rank these phrases along a continuous curve. In either instance, phrases failing in regions determined to be generally non-interesting may be filtered out (or weighted less) than phrases falling in regions determined to generally produce interesting phrases.

While illustrated filter 828 is shown to score phrases based on phrase and word commonality, word count and readability, other implementations may use more or fewer parameters. For instance, in some implementations filter 828 factors in a source of the phrase. That is, the filter may take into account the technique used to generate the particular phrase. For instance, if the testing users appeared to prefer SIPs to constructed phrase, then scoring module 842 may score SIPs higher than constructed phrases. This analysis may also be true within a particular generation technique. For instance, if users preferred one POS/class template over another, then constructed phrases built with this particular template may score higher than the latter constructed phrases (and, hence, service 110 may suggest these phrases more often).

Other factors that filter 828 may take into account include a longest consonant run of a phrase, whether the phrase has two or more words that begin with the same letter (alliteration), the length of the phrase in characters, or any other factor that may influence perceived interestingness of a phrase to users.

In some embodiments, the most relevant factors of an interestingness of a phrase include the technique that generated the phrase, the commonality of the phrase, the commonality of the word(s) of the phrase, the readability of the phrase, and a word count of the phrase. In one set of testing, the following testing results shown in Table 4 were found. In these results, the "technique" column represents the generation technique, while the "number of observations" represents the number of users that rated phrases that fall into the corresponding bucket. The interestingness column, meanwhile, represents the percentage of these phrases perceived as interesting to the testing users.

TABLE 4

| Technique | Phrase Commonality | Word Commonality | Readability | Word Count | # of Observations | Interestingness |
|---|---|---|---|---|---|---|
| Contiguous | common | common | hard | 2 | 139 | 37% |
| SIP | common | common | easy | 2 | 1839 | 33% |
| SIP | uncommon | common | easy | 2 | 145 | 32% |

TABLE 4-continued

| Technique | Phrase Commonality | Word Commonality | Readability | Word Count | # of Observations | Interestingness |
|---|---|---|---|---|---|---|
| Constructed | common | common | easy | 2 | 106 | 32% |
| Contiguous | common | common | easy | 2 | 1813 | 29% |
| Contiguous | uncommon | common | easy | 2 | 241 | 29% |
| SIP | common | common | hard | 2 | 737 | 26% |
| Contiguous | common | common | easy | 3 | 1120 | 25% |
| Contiguous | common | common | easy | 4+ | 835 | 24% |
| Constructed | uncommon | common | easy | 2 | 425 | 24% |
| Constructed | uncommon | common | hard | 2 | 147 | 24% |
| Constructed | uncommon | common | easy | 3 | 112 | 22% |
| Contiguous | common | uncommon | easy | 2 | 386 | 21% |
| SIP | common | common | easy | 3 | 622 | 20% |
| SIP | common | uncommon | easy | 2 | 851 | 20% |
| Contiguous | uncommon | common | easy | 3 | 457 | 20% |
| SIP | uncommon | common | easy | 3 | 189 | 18% |
| Contiguous | uncommon | common | easy | 4+ | 673 | 18% |
| SIP | common | uncommon | hard | 2 | 673 | 17% |
| Contiguous | common | uncommon | easy | 3 | 133 | 17% |
| Constructed | uncommon | uncommon | easy | 2 | 2044 | 16% |
| Constructed | uncommon | uncommon | hard | 2 | 1304 | 15% |
| SIP | common | uncommon | easy | 3 | 121 | 14% |
| Constructed | uncommon | uncommon | easy | 3 | 628 | 14% |
| SIP | uncommon | uncommon | hard | 2 | 267 | 13% |
| Contiguous | uncommon | uncommon | easy | 3 | 214 | 13% |
| SIP | common | common | hard | 3 | 242 | 12% |
| SIP | uncommon | uncommon | easy | 2 | 302 | 12% |
| Contiguous | uncommon | uncommon | easy | 2 | 144 | 12% |
| Contiguous | uncommon | uncommon | easy | 4+ | 161 | 12% |
| SIP | common | uncommon | hard | 3 | 110 | 5% |

In this particular instance, main observations of the testing were the following:

Constructed phrases may do well if they use common words;

SIPs of two words may be more interesting that three-word SIPs;

Common phrases containing common words may generally be perceived as interesting at a relatively high rate;

Uncommon phrases with uncommon words may rarely be perceived as interesting; and Hard-to read phrases that are based on two or more contiguous words may be deemed as interesting at a relatively high rate.

Furthermore, Table 5 lists four types of phrases that scoring module 842 may score well in some instances, as well as example phrases that reside within these buckets. Of course, it is noted that these types of phrases may or may not score well in other instances.

TABLE 5

| Attributes | Example Phrases |
|---|---|
| Two or more contiguous words, common phrase, common words, high syllables per word, two words | Political Firewall<br>Presidential Elections<br>Management Prowess<br>Political Realism<br>Unimaginably Violent |
| SIPs, common phrase, common words, low syllables per word, two words | Divine Speaker<br>White Cobra<br>Paper Machine<br>Sickly Skin<br>Cash Reservoir |
| SIPs, uncommon phrase, common words, low syllables per word, two words | Contrary Grace<br>Abstaining Monks<br>Therapist Judges<br>Chance Rhyme<br>Crummy Golfers |
| Constructed, common phrase, common words, low syllables per word, two words | Purchased Review<br>Focused Cash<br>Butter Jelly<br>Collected Wealth<br>Makeshift Gear |

Returning to FIG. 8, phrase-filtering module 802 also includes whitelist filter 830. In some instances, filtering module 802 may compare each word of a phrase to the whitelist filter to ensure that the word appears on a whitelist. If a phrase includes one or more words that do not appear on the whitelist, then filter 830 may filter out these phrases. In some instances, whitelist filter 830 includes each English language word (and/or potentially one or more other languages). As such, filter 830 checks to ensure that phrases being passed through to second corpus 808 are indeed English words (or words of the proper language, depending on context). Additionally, proper names, such as the names of users who have accounts with content provider 106, may also be added to this whitelist.

Once phrase-filtering module 802 has filtered out phrases from first corpus 806 to define second corpus 808, phrase-generation service 110 may create index 228 that maps keywords to the phrases of second corpus 808. As discussed above in regards to FIG. 2, index 228 allows phrase-suggestion module 118 to provide personalized phrases to a user by inserting into the index keywords that are associated with the user.

In some instances, service 110 may build index 228 in a manner that is reverse from how service 110 will actually use the index. That is, service 110 may create index 228 by mapping each phrase of second corpus 808 to one or more keywords. After association of the keywords to the phrases, the index is sorted by keywords such that each keyword maps to one or more phrases. Therefore, when phrase-suggestion module 118 enters one or more keywords into index 228, the index returns one or more phrases for suggestion.

To begin creation of index 228, one or more keywords are associated with a first phrase, such as "Dancing Pencil." The first keywords that are associated with this phrase are the words of the phrase itself. Therefore, "Dancing" is associated with "Dancing Pencil," as is "Pencil." Next, the stemming variations of those words are related as keywords to the phrase. In the instant example, "Dance," "Dances," "Danced," "Pencils," and "Penciled" may be associated with "Dancing Pencil."

Third, words that are related to "Dancing" and "Pencil" to a certain degree become associated with "Dancing Pencil." These related words may include synonyms, hypernyms, and hyponyms. For instance, "pen," "marker," and "highlighter" may become associated with "Dancing Pencil," as may "graphite," "mechanical," and "erasable." In some instances, a compound synonym for a word may also be related to the phrase (e.g., "non-finite" is a compound synonym of "infinite").

Next, service 110 searches for sources (e.g., books, magazines, audio content, etc.) that is related to the set of words of the phrase itself (here, "Dancing Pencil"). Once these books are found, service 110 determines words that are important to the book based on the fact that the words appear more than a threshold number of times. Service 110 then relates these words to the phrase. For example, "Dancing Pencil" could be related to a book having keywords "Ballet" and "Opera" (which appear in the book more than a threshold number of times, for instance). As such, service 110 would associate these words with "Dancing Pencil."

At this point, each phrase within second corpus 808 is associated with one or more keywords. As such, the relationships are turned around to form index 228 such that each keyword of index 228 maps to one or more phrases. Furthermore, service 110 may determine a strength of a relationship between each keyword/phrase combination and may organize index 228 accordingly. For instance, a phrase that most strongly relates to a keyword may appear first in response to entering this keyword into index 228. In other instances, service 110 may apply a stronger weight to keyword/phrase relationship based on the ranking, such that the phrases that phrase-suggestion module 118 returns in response to the entering of one or more keywords into index 228 is more likely to include phrases having strong relationships with the entered keywords. In still other instances, certain types of phrases (e.g., SIPs) are also given artificially high scores regardless of these phrases' relationship strengths to the entered keywords.

Once service 110 has created second corpus 808 and index 228, phrase-suggestion module 118 may suggest or otherwise provide phrases to one or more users. Module 118 may suggest phrases randomly, may suggest phrases from each of multiple buckets, may suggest personalized phrases, or may suggest some combination thereof.

As illustrated, phrase-suggestion module 118 may include a keyword module 846 and a pseudo-SIP module 848. Keyword module 846 functions to determine one or more keywords associated with a user and, in response, determine phrases that are related to the user. Module 118 may then suggest these personalized phrases to the user. As discussed above, keyword module 846 may determine keywords based on previously-known information about the user or based on manual or explicit input received from the user.

In either instance, keyword module 846 may insert the determined keywords into index 228 to determine related phrases. In instances where keyword module 846 inserts more than one keyword into index 228, module 846 may analyze index 228 for phrases that are associated with each of the entered words. Those phrases that are associated with each of the entered words may be deemed most-related to the entered keywords, while those phrases only related to one of the related keywords will be deemed less related. As such, phrase-suggestion module may suggest the most related phrases or may provide more of the heavily-related phrases than when compared to the tenuously- or less-related phrases.

Figure 10:
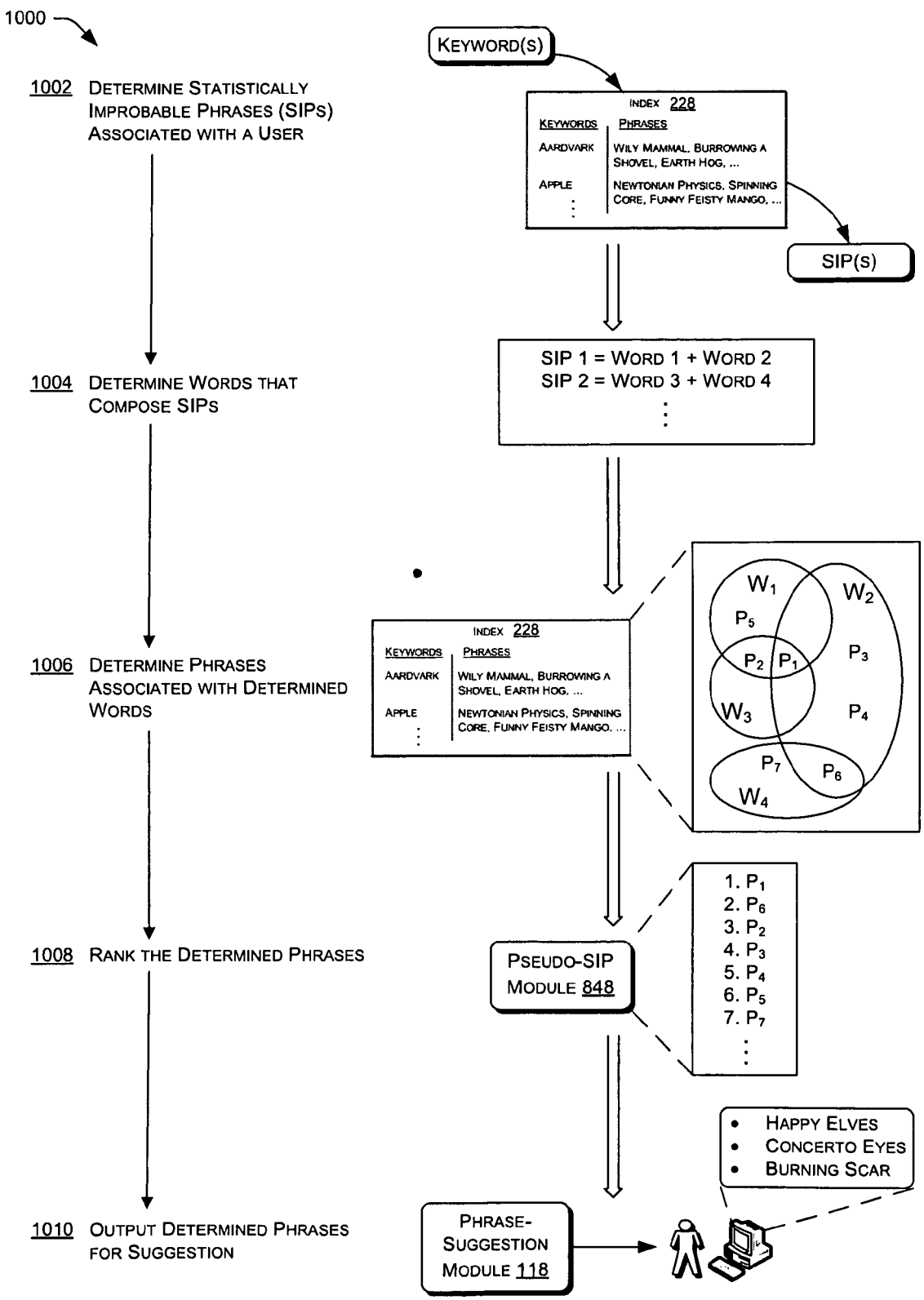
FIG. 10 illustrates an example flow diagram for determining phrases that are related to statistically improbable phrases, each of which comprises a phrase that appears in a source more than a predetermined threshold number of times.

Pseudo-SIP module 848, meanwhile, serves to determine phrases that are associated with statistically improbable phrases. In some instances, users find SIPs to be particularly interesting phrases. Therefore, Pseudo-SIP module 848 uses the interesting nature of these SIPs in order to find an even great number of interesting phrases. To do so, module 848 may insert the words of one or more SIPs into index 228 in order to determine phrases that are related to these SIPs (known as "pseudo SIPs). FIG. 10 and an accompanying discussion illustrate and describe this in detail below. Similar to SIPs, phrase-suggestion module 118 may assign a larger weight to these pseudo SIPs so that module 118 is more likely to output these types of phrases.

Once module 118 suggests or otherwise provides phrases, users such as user 102(1) may choose to select a phrase for association with the user and, potentially, with one or more aspects of a user account (such as a payment instrument of the user or the like). In response to receiving selections, phrase-association module 120 assigns the selected phrase to the user and possibly with one or more aspects of the user account.

Figure 11:
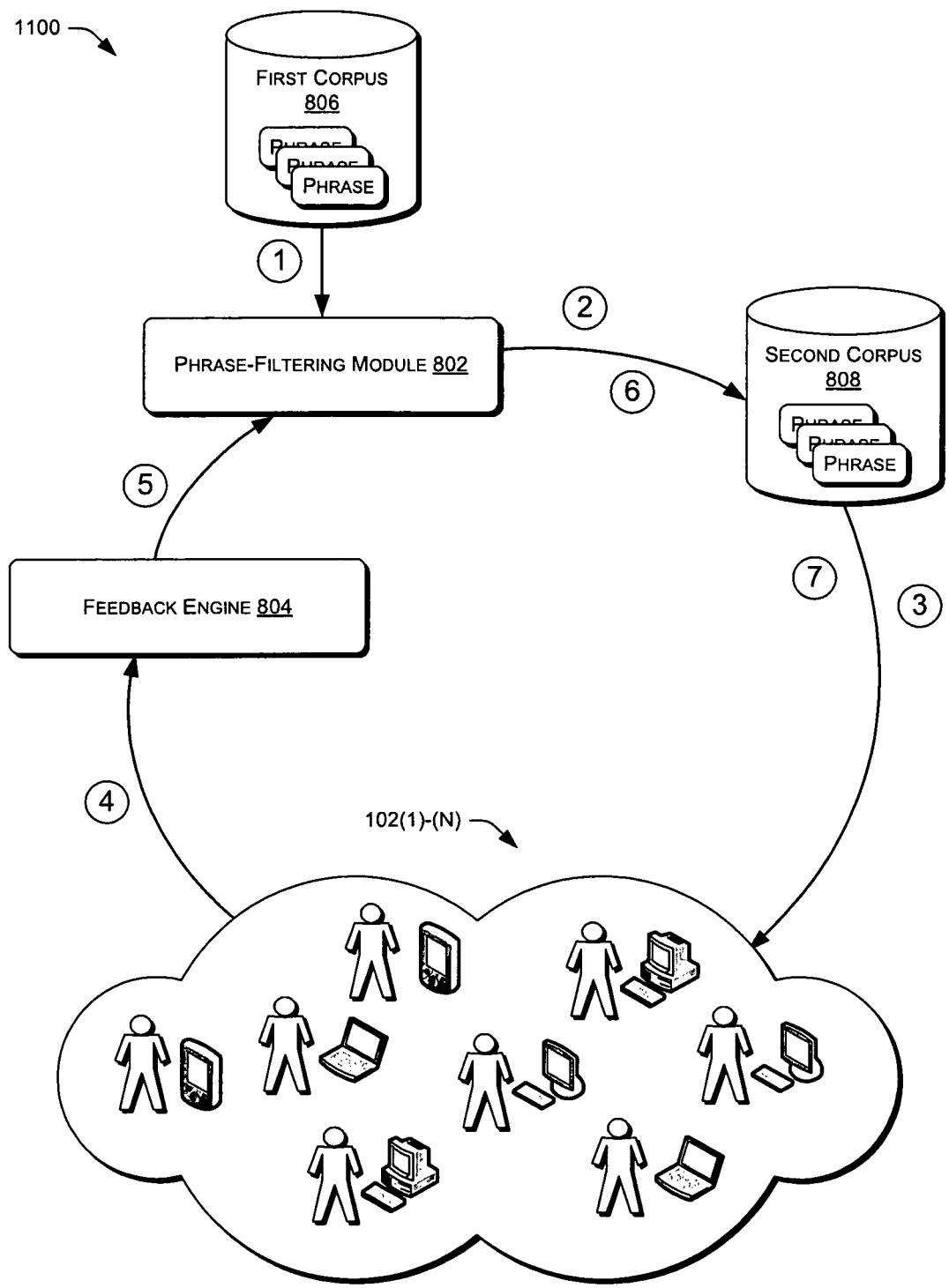
FIG. 11 illustrates an example feedback loop for learning characteristics about the phrases selected by users and, in response to the learning, altering the characteristics of phrases suggested to users.
Figure 12:
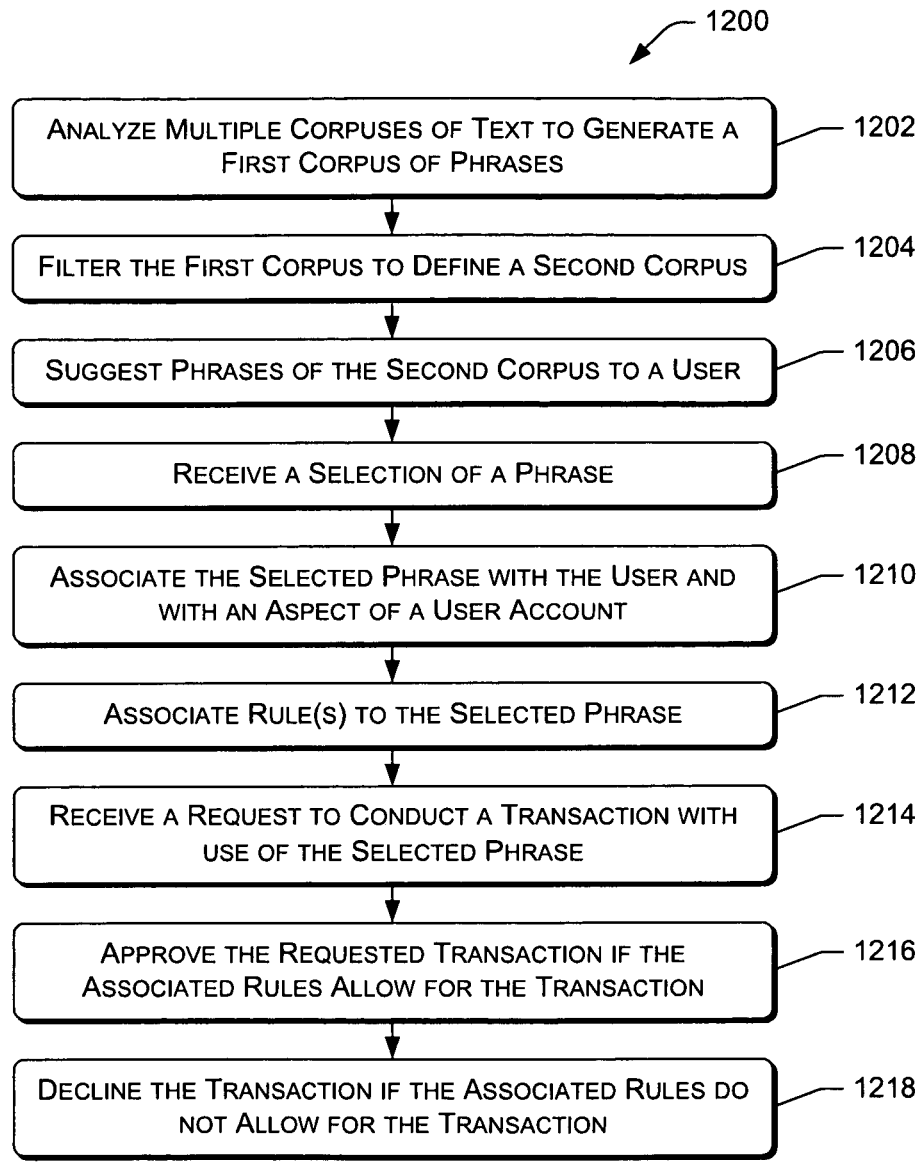
FIGS. 12-18 illustrate example processes for employing the techniques described below.

Finally, phrase-generation service 110 is shown to include feedback engine 804. Feedback engine 804 functions to track user selections of the phrases, determine characteristics of the phrases being selected, modify the criteria that generates second corpus 808 and that suggests phrases from second corpus 808 to users. FIG. 11 and an accompanying discussion illustrate and describe feedback engine 804 in detail below.

Illustrative Flow Diagrams

Figure 9:
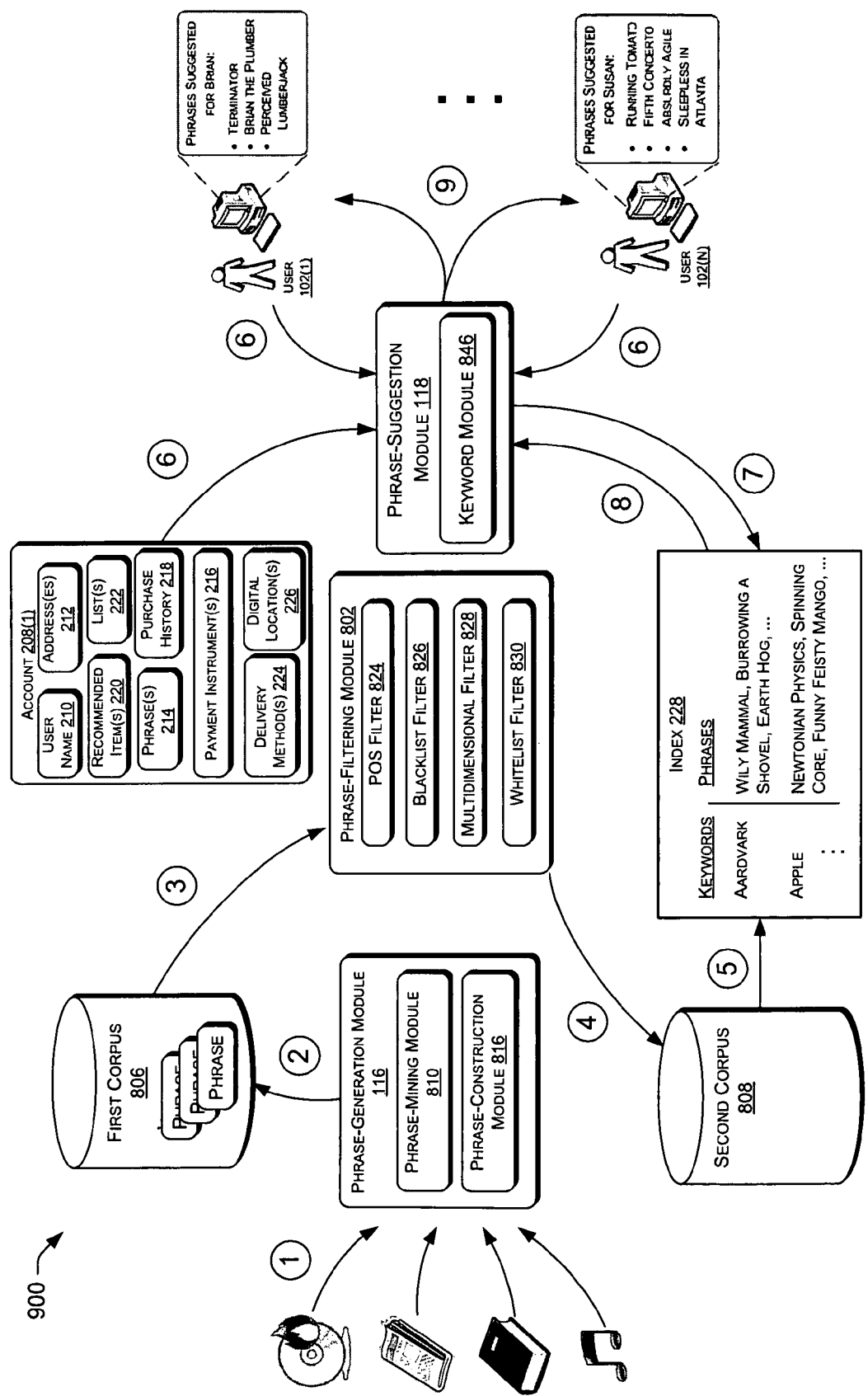
FIG. 9 illustrates an example flow diagram for generating and suggesting phrases.

FIG. 9 illustrates an example flow diagram 900 for generating and suggesting phrases in the manners discussed above. At operation one (1), phrase-generation module 116 analyzes multiple sources to generate multiple phrases. Module 116 may mine these sources to determine phrases within the sources, or module 116 may construct phrases based on words found within these sources.

At operation two (2), phrase-generation module stores these generated phrases in first corpus of phrases 806. At operation three (3), phrase-filtering module 802 receives phrases from first corpus 806. Phrase-filtering module 802 may filter these phrases via some or all of the methods described above. For instance, module 802 may filter these phrases according to determined part-of-speech combinations, according to a blacklist and/or whitelist of words or phrases, and/or based on one or more other factors. In the latter instance, module 802 may filter out phrases based on an estimated perceived interestingness of the phrases. As such, multidimensional filter 828 may score, rank and filter out phrases based on a phrase commonality, word commonality, readability, and word length, potentially amongst other factors.

At operation four (4), phrase-filtering module 802 provides phrases that have not been filtered out to define second corpus of phrases 808. Due to the filtering, second corpus 808 typically comprises fewer phrases than first corpus of phrases. Second corpus of phrases 808 may also be more likely, in some instances, to contain "good" or "interesting"

phrases. At operation five (5), phrases of second corpus of phrases 808 may be mapped to one or more keywords to create index 228.

At operation six (6), phrase-suggestion module 118 may receive one or more keywords associated with a particular user for use in suggesting personalized phrases for the user. Phrase-suggestion module 118 may receive these keywords from information previously know about the user, such as via a user account at content provider 106 or otherwise, or module 118 may receive these keywords from the user directly. For instance, the user could enter in one or more keywords into user interface 300 as discussed above in regards to FIG. 3.

Next, operation seven (7) represents that keyword module 846 of phrase-suggestion module 118 inserts these received keywords into index 228. In response, index 228 maps the inserted keywords to one or more phrases and returns these phrases to phrase-suggestion module 118 at operation eight (8). Finally, at operation nine (9), phrase-suggestion module 118 suggests some or all of the received phrases to one or more users. In response to receiving a selection of a phrase, phrase association module 120 may associate the selected phrase with the user and with one or more aspects of a user account (e.g., a payment instrument associated with the user account, a location associated with the user account (a shipping address, digital location, etc.), a delivery method associated with the user account, etc.). As discussed above, however, users may use these phrases for other reasons, such as for use as identifiers of other entities, for help in writing a book or a poem, or in any other manner.

FIG. 10 illustrates an example flow diagram 1000 of a process for determining phrases that are related to statistically improbable phrases (i.e., for determining pseudo SIPs). As discussed above, SIPs comprise phrases that occur in a corpus of text a statistically-probable number of times. Furthermore, users typically rate these phrases as interesting at a higher rate than compared to phrases generated by other techniques. Flow diagram 1000, therefore, attempts to determine more phrases that have similar characteristics to SIPs.

Flow diagram 1000 includes operation 1002, which represents determining one or more SIPs that are associated with a particular user. For instance, if a user has previously purchased a biography about Beethoven, then operation 1002 may determine that the SIP "fifth concerto" is related to the user. Similarly, if content provider 106 recommends the Lord of the Rings book to the user, then operation 1004 may determine that the SIP "One Ring" is associated with the user. In another example, the user may manually input keywords, such as "Harry Potter," in which case operation 1002 may determine that the user is now associated with the SIP "Lightning Scar."

Next, operation 1004 determines the words that compose the determined SIPs. Operation 1006, meanwhile, inserts these determined words as keywords into index 228 to determine phrases that are associated with these words. In some instances, phrases that are associated with the greatest number of the input keywords are deemed to be the most related, and so on. If certain phrases are associated with a same number of inputted keywords, then strengths of these relationships may determine which of these phrases is more related to the entered keywords than the other.

Operation 1008 then ranks the phrases that operation 1006 has mapped to the keywords. In the illustrated example, operation 1006 inserted four keywords ($W_1$, $W_2$, $W_3$ and $W_4$) into index 228. Also as illustrated, index 228 maps only a single phrase ($P_7$) to each of the four keywords. As such, operation 1008 ranks this phrase as the most-related phrase.

The other related phrases, meanwhile, are ranked in descending order according to a number of keywords that the phrases map to and, if necessary as a tiebreaker, a strength of those relationships. Again, while this represents one illustrative ranking method, other implementations may rank the related phrases (i.e., the "pseudo SIPs") in other manners.

Finally, operation 1010 outputs a portion or all of the determined phrases for suggestion to the user. As such, this user receives phrases that are likely to relate to information in which the user is interested. These phrases are also likely to contain SIP-like qualities, as Pseudo-SIP module 848 determined these phrases based on SIPs. Operation 1010 may output these phrases randomly, according to their rank, or otherwise.

While, FIG. 10 illustrates a process for determining phrases that are associated with statistically improbable phrases, the described techniques may similarly determine phrases that are associated with any one or more random or pre-selected phrases. For instance, the described techniques allow for determining phrases that are associated with a set of phrases that share a common characteristic.

To give an example, envision that a user is determined to be associated with fruit (e.g., via the user's purchase history or otherwise) and, as such, the techniques desire to determine phrases that are associated with fruit. In a manner similar to the discussion of FIG. 10 above, the techniques may determine a first set of phrases that are associated with fruit. Next, the words that compose each phrase of the first set of phrases may be determined. These words may then be inputted as keywords into an index (e.g., index 228) that maps keywords to phrases in order to determine a second set of phrases that are associated with the first set of phrases.

The phrases that are associated with these keywords (i.e., the phrases of the second set of phrases) may then be determined and, potentially, ranked. For instance, a phrase that is associated with each inputted keyword may be ranked more highly than a phrase that is only associated with a single inputted keyword. Finally, phrases of the second set of phrases may be output for suggestion to a user, for use an identifier or otherwise. In the instant example, the second set of phrases that may be output for suggestion to the user will likely somehow relate to fruit, which, again, is a theme associated with the user. As such, the described techniques took a first set of phrases related to fruit and outputted for suggestion a second set of phrases that are related to the first set of phrases (and, as such, are likely related to fruit as well).

Furthermore, while the first set of phrases may comprise phrases associated with a common theme (e.g., fruit), these phrases may share any other common characteristic. For instance, the first set of phrases may comprise phrases that were mined from a common source, that were generated in a common manner (e.g., templatized, constructed, mined, etc.), that have the same number of words, or that share any other common feature. To give another example, phrases that are mined from a common source, such as a particular website or webpage, may be entered into the index in order to find related phrase. For instance, the techniques could mine the website to determine phrases that are related to the phrases of the website (and, hence, potentially to the website itself).

For instance, the techniques could find statistically improbable phrases from the website and/or could determine phrases based on two or more contiguous words used on the website. The techniques could then determine the words that compose these phrases, before determining a second set of phrases that map to these words. This second set of phrase may, therefore, represent the content of the website to a certain degree. Furthermore, as the website (or other source) changes with time, the second set of phrases that relate to the website may also change.

FIG. 11 illustrates an example feedback loop 1100 for learning characteristics about the phrases selected by users and, in response to the learning, altering the characteristics of phrases suggested to users. As illustrated, at operation one (1) phrases of first corpus of phrases 806 are inserted into phrase-filtering module 802. As discussed above, module 802 filters out a portion of these phrases according to multiple factors, with the phrases that have not been filtered-out defining second corpus of phrases 808 at operation two (2).

Operation three (3) then suggests some portion of these phrases to each of multiple users 102(1)-(N). These suggested phrases may comprise buckets of phrases that have been generated by each generation technique discussed above. For instance, the phrases output to users 102(1)-(N) may include mined phrases (both contiguous words and SIPs), constructed phrases (based on both POS templates, POS/class templates and personalized templates), pseudo SIPs, and potentially any other form of generated phrase. Some or all of users 102(1)-(N) then select one or more phrases of these provided phrases.

Next, operation four (4) represents that feedback engine 804 may receive these user selections of phrases. In response to receiving these selections, feedback engine may analyze characteristics associated with the selected phrases. For instance, feedback engine 804 may determine which types of phrases users are selecting as well as the details about these selected phrases. For instance, feedback engine 804 may determine if users are selecting more mined phrases or more constructed phrases (or more pseudo SIPs). Within these categories, engine 804 may determine which subcategories are popular, and which are not. For instance, engine 804 may determine which POS combinations or POS/class combinations users are selecting, as well as the characteristics of selected SIPs, pseudo-SIPs, and contiguous-word mined phrases.

With this information, feedback engine 804 may determine how the filters of phrase-filtering module 802 could be tweaked so as to output to second corpus 808 phrases that more closely resembles what users 102(1)-(N) are actually selecting. Furthermore, feedback engine 804 may determine which category and sub-category users are selecting and, in response, can cause alteration of the percentage-size of each of the suggested buckets.

At operation five (5), feedback engine 804 makes a determination that the filters of module 802 should be tuned to better reflect the phrase selections of users 102(1)-(N). In response, module 802 tweaks the corresponding filter and outputs, at operation six (6), a new set of phrases that now defines a newly-sculpted second corpus of phrases 808. Furthermore, at operation seven (7), second corpus 808 may output a new set of suggested phrases. In some instances, the makeup of these suggested phrases varies from the previous set of suggested phrases. For instance, these suggested phrases may contain a greater percentage of phrases generated via a popular technique (e.g., two-word SIPs) and a lesser percentage of phrases generated via a less popular technique (e.g., [NN]-[NN] constructed phrases that comprise a common phrase). With use of feedback loop 1100, phrase-generation service 110 is able to quickly and aptly respond to tune the phrases being suggested or otherwise provided to users in order to better suit users' desires.

Furthermore and as discussed above in regards to FIG. 3, users 102(1)-(N) may choose to select non-suggested phrases. That is, users may choose to create their own phrase. In these instances, feedback engine 804 will again receive this information at operation four (4). Armed with this information, feedback engine 804 may learn that users are creating certain types of phrases that second corpus of phrases 808 is not providing. Feedback engine 804 may accordingly attempt to determine how phrase-filtering module 802 could be tweaked to create these types of phrases.

For instance, engine 804 may determine that a particular POS combination that module 802 has been filtering out is actually quite popular amongst users 102(1)-(N). As such, engine 804 may instruct phrase-filtering module 802 to remove this POS combination from a POS-exclusion list of the POS filter (or engine 804 may instruct module 802 to add this POS combination to a POS inclusion list). In either instance, phrases of this particular POS combination may form a portion of second corpus 808 and, as such, may be suggested to users 102(1)-(N) for selection.

Illustrative Processes

FIGS. 12-18 illustrate example processes 1200, 1300, . . . , 1800 for implementing the techniques described above. While these processes are described with reference to the architectures discussed above, the described techniques may be equally applicable in many other architectures and environments. Furthermore, the described process can be implemented in hardware, software, or a combination thereof. In the context of software, the illustrated operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 1200 includes operation 1202, which analyzes multiple corpuses of text to generate a first corpus of phrases. As discussed above, these corpuses of text may come from any source, including books, magazines, newspapers, online content, audio content, video content or any other source. Furthermore, this operation may generate these phrases in any of the ways discussed above or otherwise. For instance, this operation may mine phrases, construct phrases, or determine phrases in any way. Operation 1204, meanwhile, represents filtering the first corpus of phrases to define a second corpus of phrases. This filtering may include filtering phrases by part-of-speech combinations, according to a blacklist or a whitelist, according to one or more of the multiple factors discussed above (e.g., commonality, readability, length, etc.), or otherwise.

Next, operation 1206 suggests phrases of the second corpus of phrases to a user. This operation may suggest these phrases visually, orally, or in any other suitable manner. Operation 1208 receives a selection of a phrase, either from the suggested phrases or otherwise. In response, operation 1210 associates the selected phrase with the user and, potentially, with an aspect of a user account of the user. For instance, operation 1208 may associate the selected phrase with a payment instrument associated with the user account, a location (e.g., shipping address, digital location, etc.) associated with the user account, a delivery method associated with the user account, or the like. In these instances, the user may be able to conduct transactions with use of the phrase (and with, for instance, the associated payment instrument, location, or delivery method).

Process 1200 continues to operation 1212, which associates rules to the selected phrase. In some instances, a user to whom the phrase is associated selects one or more of these rules. Next, operation 1214 receives a request to conduct a transaction with use of the selected phrase. For instance, content provider 106 or another content provider may receive a request from the user to purchase, rent, or otherwise consume an item. At operation 1216, the content provider approves the requested transaction if the associated rules allow for the transaction. Operation 1218, however, declines the transaction if the associated rules do not allow for the transaction.

Figure 13:
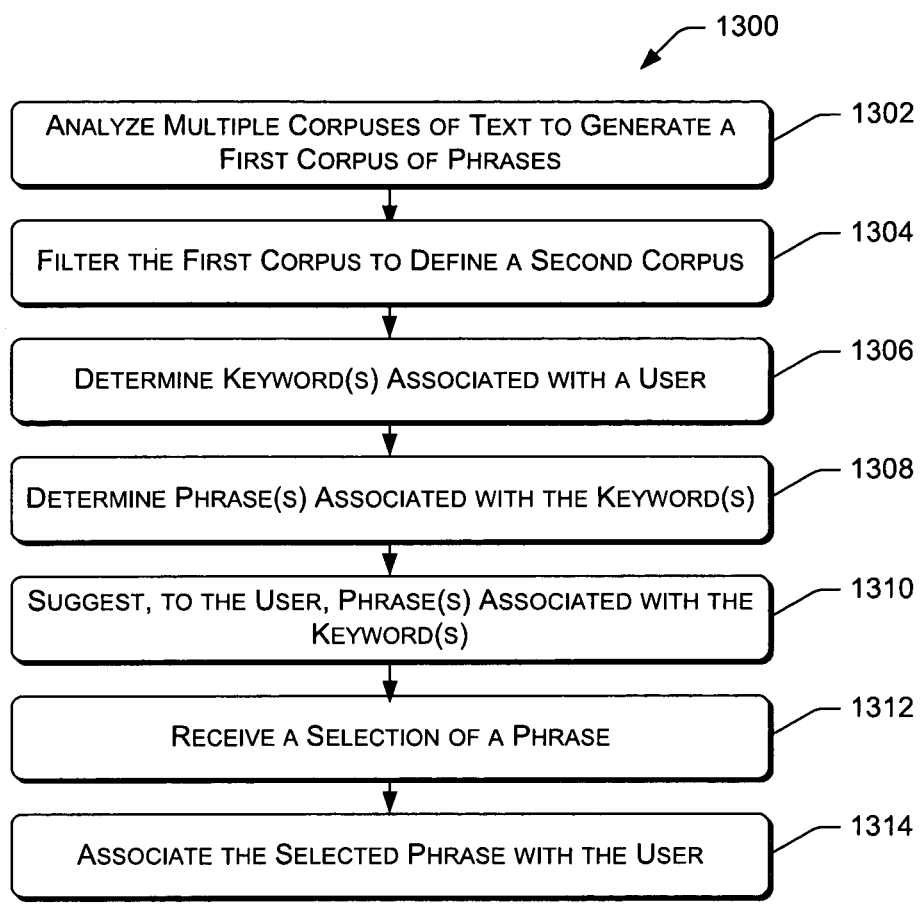

FIG. 13 illustrates an example process 1300 for suggesting phrases, such as the phrases generated by the techniques described above. Process 1300 includes operation 1302, which represents analyzing multiple corpuses of text to generate a first corpus of phrases. Next, operation 1304 filters the first corpus of phrases to define a second corpus. Operation 1306 then determines keywords associated with a particular user. In some instances, this operation bases this keyword on previously-known information about the user (e.g., name, address, purchase history, etc.), while in other instances this keyword is based on an input from the user.

Process 1300 further includes Operation 1308, which represents determining phrases that are associated with the determined keywords. This operation may include, for instance, analyzing an index (e.g., index 228) that maps keywords to phrases. Operation 1310 then suggests, to the user, some or all of the phrases that operation 1308 determines to be associated with the keyword(s). These suggestions may be in a ranked order, beginning with the most-related or may be suggested in any other manner (e.g., weighted by score, randomly, etc.).

Operation 1312, meanwhile, receives a selection of a phrase from the user. This selection may be from the suggested phrases or this selection may be a user-inputted phrase. Finally, operation 1314 associates the selected phrase with the user and, in some instances, with a payment instrument of the user.

Figure 14:
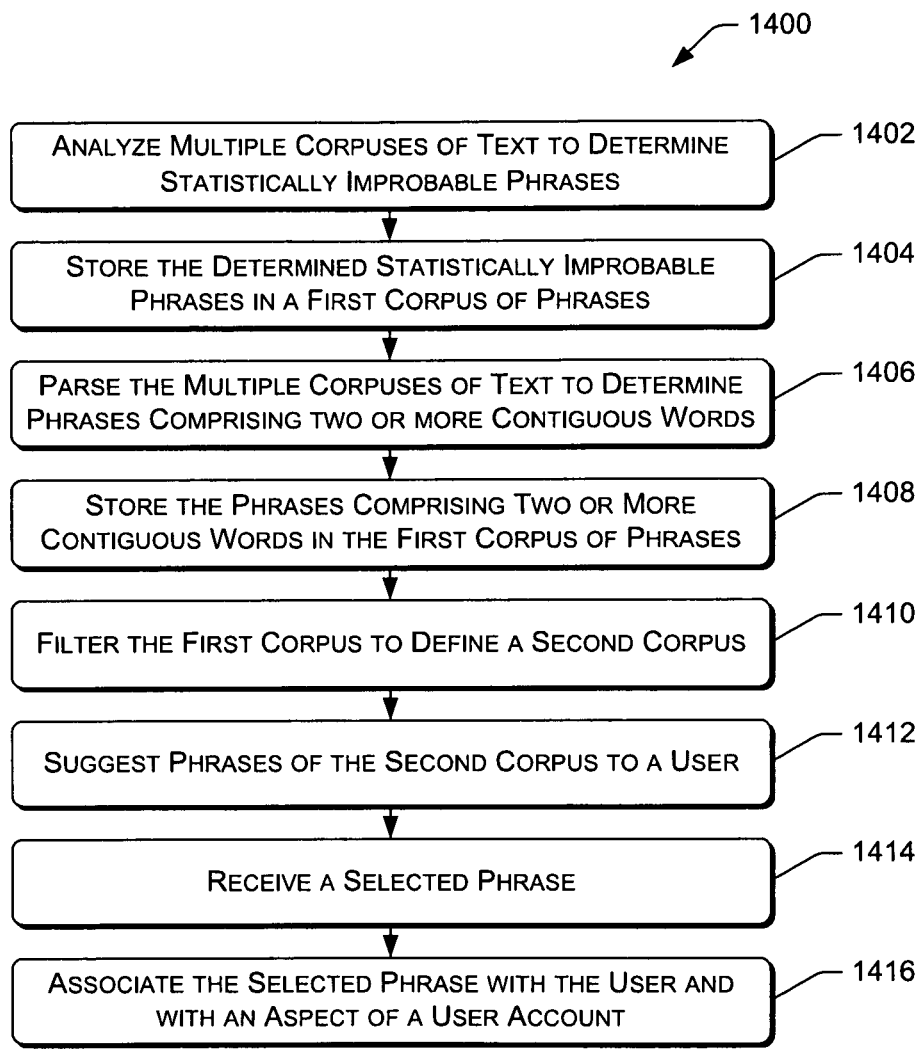

FIG. 14 illustrates an example process 1400 for generating phrases by mining multiple sources. Operation 1402 analyzes multiple corpuses of text to determine statistically improbable phrases. As discussed above, statistically improbable phrase include phrases that appear in a corpus of text more than a predetermined threshold number of times. Next, operation 1404 stores the determined statistically improbable phrases in a first corpus of phrases.

Operation 1406, meanwhile, parses the multiple corpuses of text to determine phrases comprising two or more contiguous words. In some instances, these words are free from separation by punctuation (e.g., a comma, a period, etc.). Furthermore, in some instances, these determined phrases comprise between two and seven words. Next, operation 1408 stores the determined contiguous words in the first corpus of phrases. Operation 1410 then filters the first corpus of phrases to define second corpus of phrases, while operation 1412 suggests phrases of the second corpus to a user. Operation 1414 receives a selection and, in response, operation 1416 associates the selected phrase with the user and with an aspect of a user account of the user (e.g., a payment instrument, a location, a delivery method, or the like).

Figure 15:
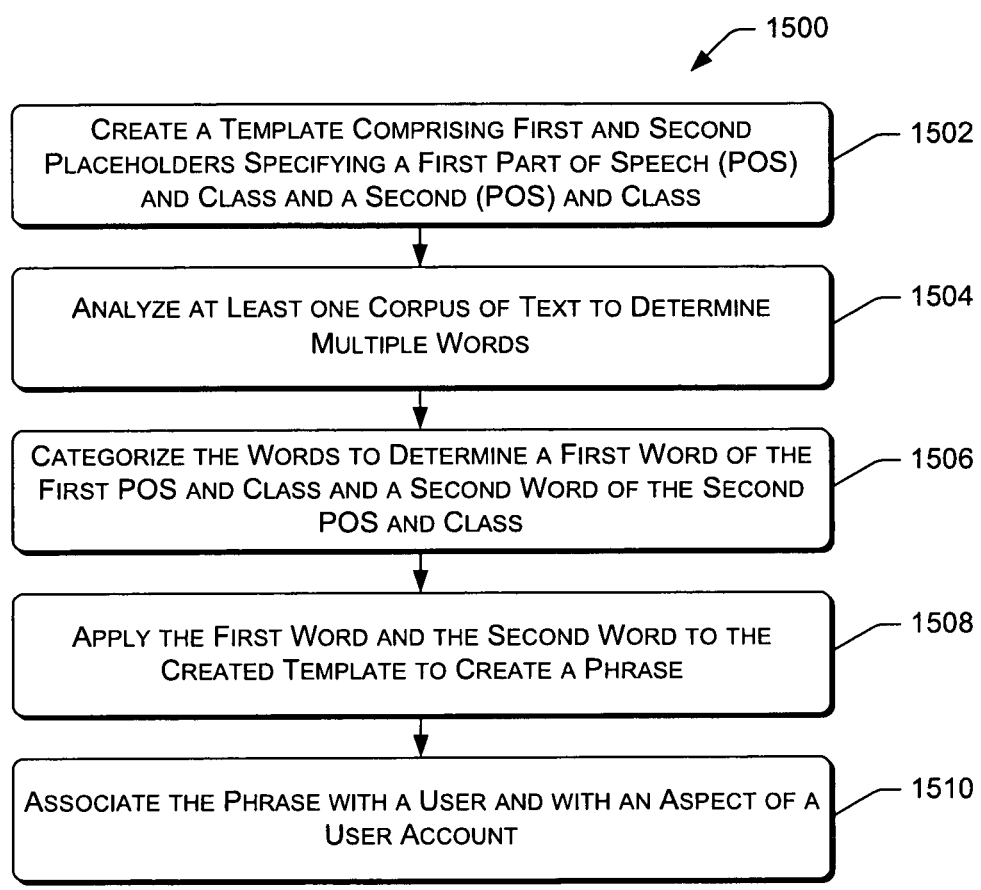

FIG. 15 illustrates an example process 1500 for generating phrases via the construction techniques discussed above. First, operation 1502 represents creating a template comprising at least first and second placeholders. The first placeholder specifies a first part of speech and a first describable class, while the second placeholder specifies a second part of speech and a second describable class. The describable classes may specify any grouping of words that, when associated with a part of speech, specify a subset of words having the specified part of speech. For instance, a class may be "words that relate to movement." When coupled with a verb part of speech, the specified subset of words may include "run," "dance," "walk," and the like. Furthermore, while the first and second parts of speech and/or the first and second classes may be different in some instances, in other instances they may be the same. For illustrative purposes, an example created template may comprise the following placeholders: [a verb in a gerund form that relates to movement] and [a noun that describes a fruit].

Operation 1504 then analyzes at least one corpus of text to determine multiple words. For instance, operation 1504 may mine a dictionary or any other source. Next, operation 1506 categorizes the determined words, thereby determining a first word having the specified first part of speech and first class and a second word having the second part of speech and the second class. In the example template described immediately above, for instance, operation 1506 may determine a first word "dancing" and a second word "bananas." Operation 1508 then applies the determined first and second words to the created template to create a phrase. In the instant example, operation 1508 may create the phrase "dancing bananas." Finally, operation 1510 associates this phrase with a user and with an aspect of a user account of the user (e.g., a payment instrument, a location, a delivery method, or the like) in response to receiving a selection of this phrase.

Figure 16:
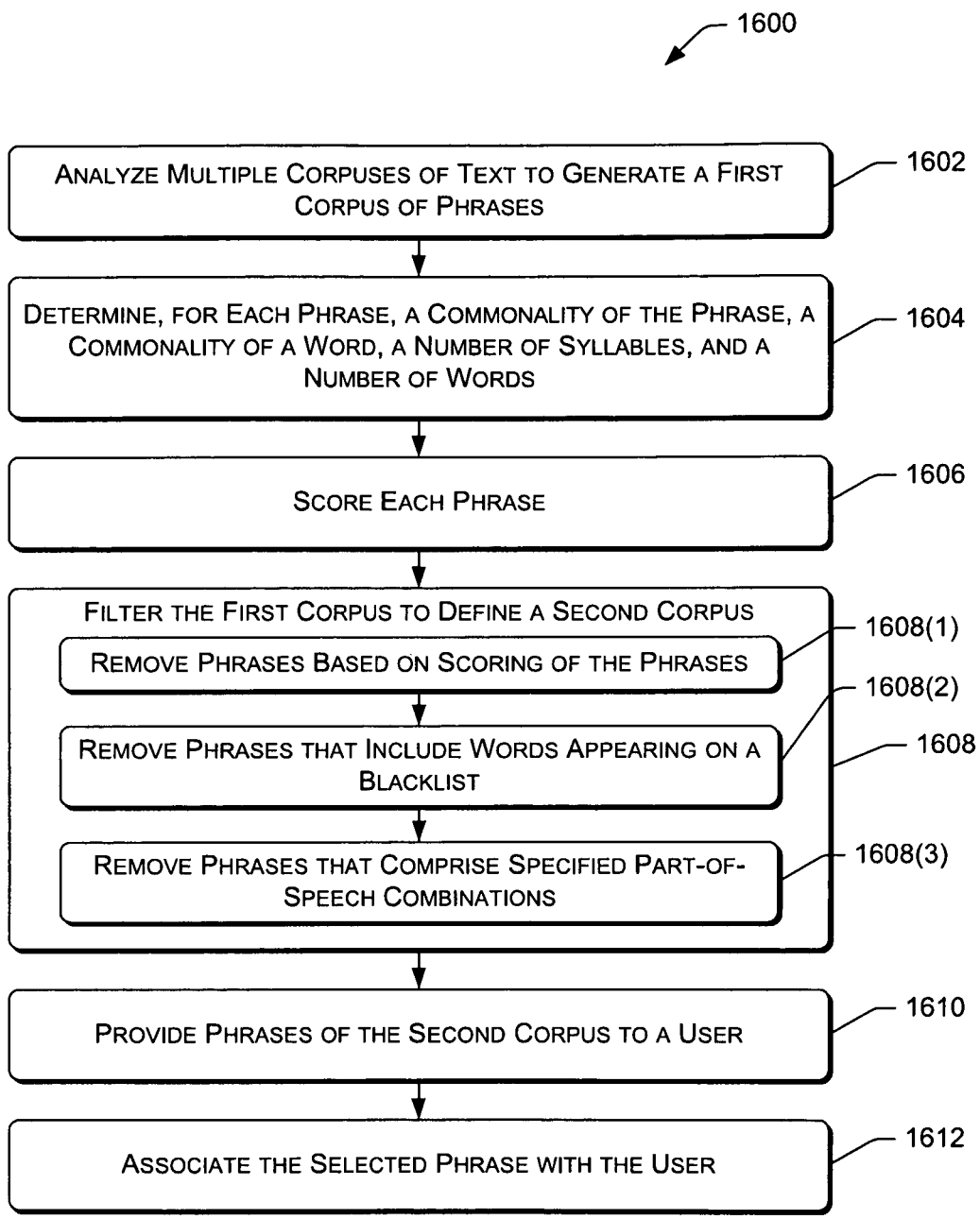

FIG. 16 illustrates an example process 1600 for filtering phrases. Similar to the processes described above, operation 1602 represents analyzing multiple corpuses of text to generate a first corpus of phrases. Next, operation 1604 determines, for each phrase, a commonality of the phrase, a commonality of a word of the phrase, a number of syllables in the phrase, and a number of words in the phrase. Operation 1606 then scores each of the phrases based at least in part on the determined values of operation 1604.

Next, operation 1608 then filters the first corpus of phrases to define a second corpus of phrases. As illustrated, operation 1608 represents sub operations 1608(1), (2), and (3). Sub-operation 1608(1) removes phrases based on the scoring of the phrases from operation 1606. Next, operation 1608(2) removes phrases that include words appearing on a blacklist of words. Finally, operation 1608(3) removes phrases that comprise specified part-of-speech combinations.

Operation 1610, meanwhile, provides phrases of the second corpus of phrases to a user for selection. In response to receiving a selection of a phrase, operation 1612 associates the selected phrase with the user.

Figure 17:
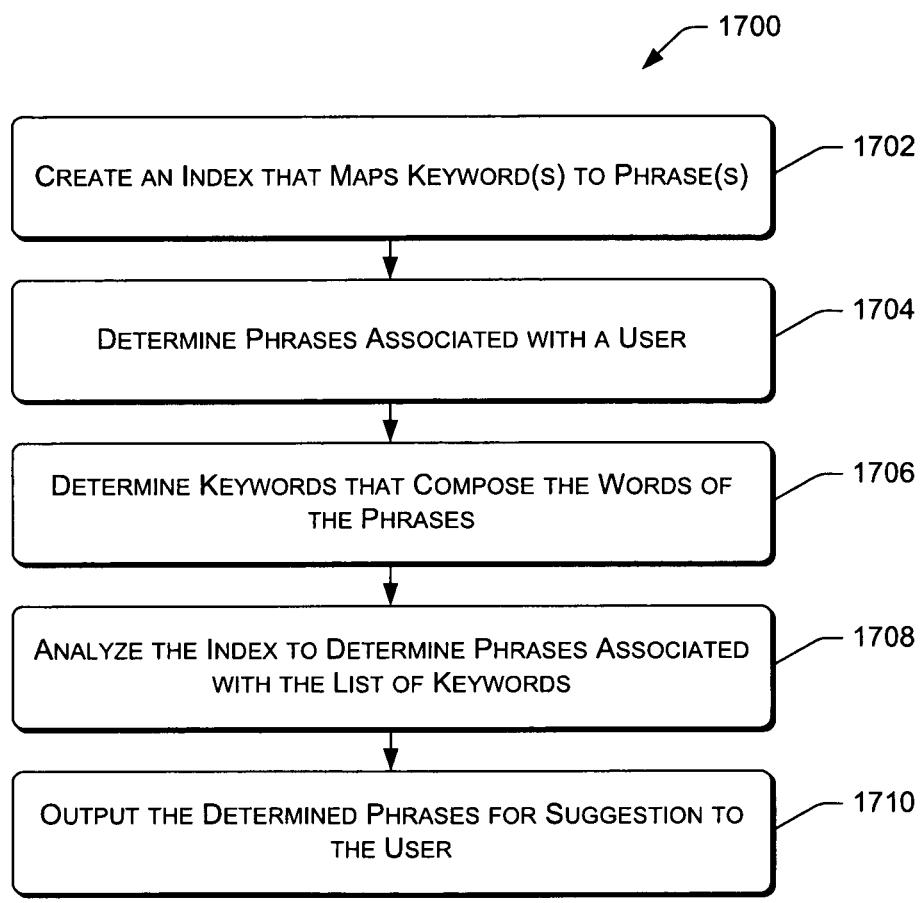

FIG. 17 illustrates an example process 1700 for determining phrases that are related to one or more other phrases. These one or more other phrases may, in some instances, share one or more common characteristics. For instance, these one or more phrases may each comprise a statistically improbable phrase (within the same source or different sources). As discussed above, phrases that are determined to be related to statistically improbable phrases tend to themselves share characteristics of statistically improbable phrases and, as such, are often perceived as interesting to users.

Process 1700 includes operation 1702, which represents creating an index that maps keywords to phrases. For instance, operation 1702 may represent creating index 228 illustrated in FIG. 2. Next, operation 1704 determines one or more phrases that are associated with a user. In instances where these phrases comprise statistically improbable phrases, operation 1704 may include determining books that are associated with the user (e.g., via purchase history 218, item recommendations 220, etc.) and determining statistically improbable phrases that appear in these books. Operation 1706 then determines the words that compose the phrases that are associated with the user.

With use of the words as keywords, operation 1708 analyzes the created index to determine phrases that are associated with the keywords. This may include, determining phrases that are associated with each of the keyword, all but one of the keywords, and so forth down to the phrases that are only associated with a single inputted keyword. Finally, operation 1710 outputs at least a portion of the determined phrases for suggestion to a user. In some instances, operation 1710 outputs the most-related phrases to the user, while in other instances operation 1710 outputs these phrases randomly or in another manner.

Figure 18:
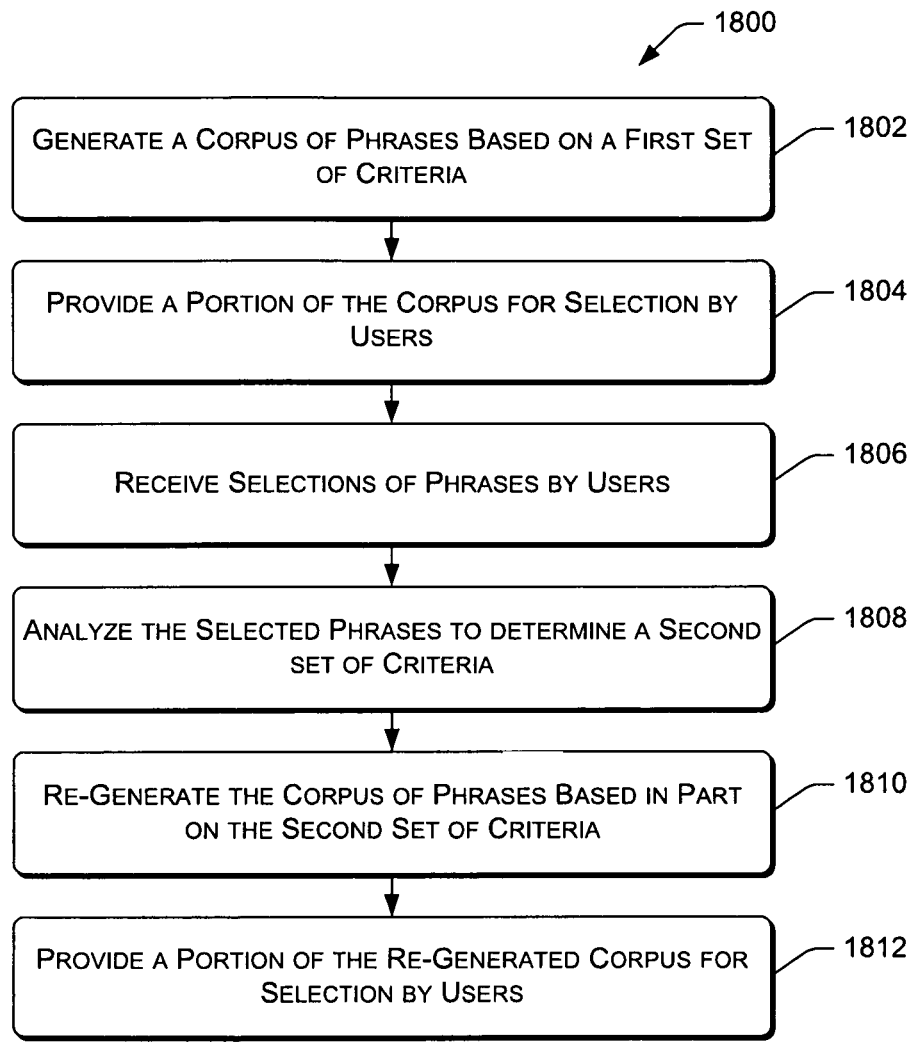

FIG. 18 illustrates an example process 1800 that feedback engine 804 may implement. Operation 1802 first represents generating a corpus of phrases based on a first set of criteria. For instance, this first set of criteria may comprise specified filter parameters, a specified weighting of phrases by generation technique, or any other criteria that may be used in generating the corpus. Next, operation 1804 provides a portion of the corpus for selection by users. For instance, this operation may suggest these phrases via user interface 300, orally, or otherwise.

Operation 1806, meanwhile, receives selections of phrases by users, while operation 1808 analyzes the selected phrases to determine a second set of criteria. For instance, operation 1808 may determine that users tend to select mined phrases at a higher rate than constructed phrases. Additionally or alternatively, operation 1808 may determine that users tend to select phrases that have a particular score that is based on a phrase commonality, word commonality, readability and word length.

In response, operation 1810 re-generates the corpus of phrases based at least in part on the second set of criteria. For instance, operation 1810 may tweak the filters based on the second criteria and/or may alter the distribution of provided phrases based on generation technique. After this re-generation, operation 1812 represents providing a portion of the re-generated corpus for selection by users. As discussed above, these phrases may be associated with users in response to received user selections.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at least in part by one or more computing devices, the method comprising:
   creating, by the one or more computing devices, multiple templates where individual ones of the multiple templates specify two or more placeholders;
   for individual ones of the multiple templates, associating, by the one or more computing devices, a first word with the first placeholder and a second word with the second placeholder to create a phrase;
   aggregating, by the one or more computing devices, the phrase of individual ones of the multiple templates to create a corpus of phrases;
   accessing, by the one or more computing devices, previously collected information associated with a user, wherein the previously collected information includes at least one of a name of the user, one or more addresses of the user, one or more phrases that have previously been associated with the user, a purchase history of the user, items previously recommended for the user, or lists associated with the user;
   outputting, by the one or more computing devices, based at least in part on the previously collected information at least one personalized phrase of the corpus of phrases for presentation to the user;
   receiving, by the one or more computing devices, a selection from the user of at least one personalized phrase of the corpus of phrases;
   associating, by the one or more computing devices, the at least one personalized phrase of the corpus of phrases with a payment instrument of the user;
   receiving, by the one or more computing devices, a request to execute a payment transaction, the request including the at least one personalized phrase;
   identifying, by the one or more computing devices, the payment instrument of the user based on the at least one personalized phrase included in the request; and
   completing, by the one or more computing devices, the payment transaction based on the at least one personalized phrase.

2. A method as recited in claim 1, wherein the first placeholder specifies a first part of speech and the second placeholder specifies a second part of speech, and wherein the first word that is associated with the first placeholder comprises the first part of speech and the second word that is associated with the second placeholder comprises the second part of speech.

3. A method as recited in claim 1, wherein the first placeholder specifies a first part of speech and a first class and the second placeholder specifies a second part of speech and a second class, and wherein the first word that is associated with the first placeholder comprises the first part of speech and the first class and the second word that is associated with the second placeholder comprises the second part of speech and the second class.

4. A method as recited in claim 3, wherein the first class specifies a subset of words of the first part of speech, and the second class specifies a subset of words of the second part of speech.

5. A system comprising:
   one or more processors;
   memory;
   one or more templates, stored in the memory, individual ones comprising a placeholder that specifies a part of speech;
   a phrase-generation module, stored in the memory and executable on the one or more processors, to associate words having corresponding parts of speech with the respective placeholder of the one or more templates to create a corpus of phrases;
   a phrase-suggestion module, stored in the memory and executable on the one or more processors to:

retrieve information associated with a user account of a user, wherein the retrieved information includes at least one of a name of the user, one or more addresses of the user, one or more phrases that have previously been associated with the user, a purchase history of the user, items previously recommended for the user, or lists associated with the user; and suggest, based on the retrieved information, at least one of the phrases of the corpus of phrases for selection by the user; and a phrase-association module, stored in the memory and executable on the one or more processors, to provide at least one of the phrases for association with a payment instrument of the user.

6. A system as recited in claim 5, wherein the phrase-generation module is further executable on the one or more processors to: (i) determine parts of speech for individual ones of multiple words, and (ii) associate, with individual ones of the placeholders, a word having a part of speech specified by the placeholder.

7. A system as recited in claim 5, wherein at least one of the placeholders further specifies a class that defines a subset of words associated with the part of speech specified by the respective template.

8. A system as recited in claim 5, further comprising a phrase-filtering module, stored in the memory and executable on the one or more processors, to filter out phrases from the corpus of phrases based at least in part on a commonality of the phrases, commonality of one or more words of the phrases, readability of the phrases, length of the phrases, or sources of the phrases.

9. A system as recited in claim 5, further comprising a phrase-filtering module, stored in the memory and executable on the one or more processors, to filter out phrases that appear on a blacklist of phrases or that comprise words that appear on a blacklist of words.

10. A system as recited in claim 5, wherein individual ones of the one or more templates comprise at least two placeholders, individual ones of the placeholders specifying a part of speech, and wherein the phrase-generation module is further executable on the one or more processors to associate a word with individual ones of the at least two placeholders.

11. A method as recited in claim 1, wherein the associating further includes associating the at least one phrase of the corpus of phrases with a shipping address of the user.

12. A method as recited in claim 1, wherein the associating further includes associating the at least one phrase of the corpus of phrases with a digital location of the user.

13. A method as recited in claim 1, wherein the associating further includes associating the at least one phrase of the corpus of phrases with a billing address of the user.

14. A method as recited in claim 1, wherein the associating further includes associating the at least one phrase of the corpus of phrases with a delivery method preference.

15. A method as recited in claim 1, wherein the associating further includes associating the at least one phrase of the corpus of phrases with a set of payment transaction rules set by the user.

16. A method as recited in claim 1, the acts further comprising:

ranking the aggregated phrases of the corpus of phrases, at least partly prior to the outputting, based at least in part on the previously collected information.

17. A system as recited in claim 5, wherein the phrase-suggestion module is further executable on the one or more processors to rank the at least one of the phrases of the corpus of phrases, at least partly prior to the suggesting, based at least in part on the retrieved information.

18. One or more non-transitory computer-readable media storing computer-executable instructions that, when executed on one or more processors, configure the one or more processors to perform acts comprising:

creating multiple templates where individual ones of the multiple templates specify two or more placeholders;

for individual ones of the multiple templates, associating a first word with the first placeholder and a second word with the second placeholder to create a phrase;

aggregating the phrase of individual ones of the multiple templates to create a corpus of phrases;

accessing previously collected information associated with a user account of a user, wherein the previously collected information includes at least one of a name of the user, one or more addresses of the user, one or more phrases that have previously been associated with the user, a purchase history of the user, items previously recommended for the user, or lists associated with the user;

outputting, based at least in part on the previously collected information at least one personalized phrase of the corpus of phrases for presentation to the user;

receiving a selection from the user of at least one personalized phrase of the corpus of phrases; and associating the at least one personalized phrase of the corpus of phrases with a payment instrument of the user.

19. The one or more non-transitory computer-readable media as recited in claim 18, the acts further comprising:

receiving a request to execute a payment transaction, the request including the at least one personalized phrase;

identifying the payment instrument of the user based on the at least one personalized phrase included in the request; and completing the payment transaction based on the at least one personalized phrase.

20. The one or more non-transitory computer-readable media as recited in claim 18, the acts further comprising:

ranking the aggregated phrases of the corpus of phrases, at least partly prior to the outputting, based at least in part on the previously collected information.

\* \* \* \* \*